United States Patent [19]

McGinniss et al.

[11] Patent Number: 5,441,743
[45] Date of Patent: Aug. 15, 1995

[54] MARINE COMPOSITIONS BEARING PREFERENTIALLY CONCENTRATED DOMAINS OF NON-TIN, ORGANO ANTI-FOULING AGENTS

[75] Inventors: Vincent D. McGinniss, Sunbury; Richard J. Dick, Columbus, both of Ohio

[73] Assignee: Battelle Memorial Institute, Columbus, Ohio

[21] Appl. No.: 56,589

[22] Filed: Apr. 30, 1993

Related U.S. Application Data

[63] Continuation of Ser. No. 702,241, May 17, 1991, abandoned, which is a continuation-in-part of Ser. No. 287,899, Dec. 21, 1988, abandoned.

[51] Int. Cl.$^6$ .............................................. A01N 25/24
[52] U.S. Cl. ..................... 424/407; 424/405; 424/406; 424/409
[58] Field of Search ............. 424/405, 407, 409; 523/122, 177

[56] References Cited

U.S. PATENT DOCUMENTS

| | | | |
|---|---|---|---|
| 2,738,283 | 3/1956 | Furness | 106/17 |
| 4,413,073 | 11/1983 | Gibson et al. | 523/511 |
| 4,428,989 | 1/1984 | Marshall | 428/35 |
| 4,593,055 | 6/1986 | Gitlitz et al. | 523/122 |
| 4,812,511 | 3/1989 | Dormeier et al. | 524/850 |
| 4,814,184 | 3/1989 | Aguadisch et al. | 424/486 |
| 4,906,466 | 3/1990 | Edwards et al. | 424/78 |
| 4,938,958 | 7/1990 | Niira | 424/79 |
| 4,990,547 | 2/1991 | Stovicek | 424/405 |
| 5,229,124 | 7/1993 | Rei et al. | 424/409 |

*Primary Examiner*—Thurman K. Page
*Assistant Examiner*—Neil Levy
*Attorney, Agent, or Firm*—Mueller and Smith

[57] ABSTRACT

The present invention is addressed to a curable, marine anti-fouling composition of a thermoplastic or thermosetting binder, solvent, non-tin, organo antifouling agent, and optionally conventional additives, e.g. leaching agents, opacifying pigments, etc. The anti-fouling agents are found in preferentially-concentrated domains (hereinafter, often referred to as "PCD") in the cured compositions. The PCDs can be termed non-homogeneous, phase-separated, or incompatible in the system. The art term used in describing the PCDs of anti-fouling agent is not limitative of the invention as the disclosure herein will demonstate. Preferably, PCDs are created by forming an oligomeric adduct of the anti-fouling agent which adduct is formed into PCDs upon the curing of the composition. Additional techniques for forming PCDs of anti-fouling agent are revealed herein. The present invention also is addressed to new, low toxicity anti-fouling agents which comprise pesticide or herbicide compounds having a X factor of between about 0.01 and 3, a Z value for vinyl or aromatic compounds of between about 0.01 and 0.08, and an LD50 value of greater than 200 mg/kg against rats or mice. Such pesticide or algicide compounds broadly can be selected from heterocyclic compounds, aromatic compounds substituted with heteroatom substituents, various amino compounds, carbocyclic vinyl ether ketones, certain phospho compounds, certain polychlorinated carbocyclic and acyclic compounds, certain chlorinated carbocyclic carboxylates, antimony tartrate, boric acid, and cupric oleate. Exemplary aromatic compounds include diaromatic compounds linked with a sigma bond or with a carbon or heteroatom linkage, fused aromatic rings, and mono-aromatic compounds.

13 Claims, 9 Drawing Sheets

MARINE COMPOSITIONS BEARING PREFERENTIALLY CONCENTRATED DOMAINS OF NON-TIN, ORGANO ANTI-FOULING AGENTS

CROSS-REFERENCE TO RELATED APPLICATIONS

This application is a continuation of application U.S. Ser. No. 07/702,241, filed May 17, 1991, now abandoned, which is a continuation-in-part of application U.S. Ser. No. 07/287,899, filed on Dec. 21, 1988, now abandoned, the disclosures of which are expressly incorporated herein by reference.

BACKGROUND OF THE INVENTION

The present invention relates to anti-fouling marine coatings and more particularly to novel low toxicity anti-fouling agents therefor. One of the earliest needs for performance-oriented coatings was in the marine environment. Early formulations were designed around known toxins, such as copper and mercury compounds. Nineteenth Century marine coatings typically used creosote and natural drying oil formulations bearing the toxins. For ship bottoms, presently, anti-fouling compounds based on copper and tin commonly are incorporated into somewhat water-sensitive binders to afford gradual break-down of the film to permit a sustained release of the "poison". This required self-erosion property necessitates frequent repainting of ship bottoms, depending upon location and severity of exposure conditions.

Today's anti-fouling coatings use two general leaching mechanisms, depending on the type of resin matrix selected, soluble or insoluble. The insoluble-matrix type leaves a resinous skeleton intact as the toxicant particles are removed by dissolving into solution in seawater. This also is called the contact type because it depends upon the toxicant migrating to the surface and entering solution by making contact with seawater. Since the resins are somewhat water-permeable, the toxic particles may diffuse through the semi-permeable coating, and as one particle dissolves, another is exposed to seawater. The contact type contains several times more toxicant than the soluble type. The resulting thicker films of toxicant provide a longer service life to the anti-fouling topcoats. As a general rule, the insoluble-matrix type of paint does not contain an extended pigment, and the geometry of the dry film requires high toxicant loadings (52% to 74% by volume) to ensure the $Cu_2O$ particles will be in continuous contact with each other. Below the level of cubic packing (52%), the resin will encase the $Cu_2O$ particles and prevent solution; above the level of hexagonal packing (74%), the coating will be too-resin poor to maintain film integrity. These figures may vary somewhat in actual practice and it is common to adjust the leaching rate and the effective range of toxicant loading (e.g. by the addition of rosin or other natural resins). In common practice, both natural resins and extender pigments are frequently used. When high levels of rosin are used and high erosion might be expected, tougheners such as ester gum, ethyl cellulose, and modified rubbers are added. (*Paint Handbook*, G. E. Weismantel, McGraw-Hill, New York, N.Y., pp 14–43 and 14–44; and R. J. Dick, *Marine Paints*, Chapter 14).

With respect to the toxins presently used in marine anti-fouling paints, recent U.S. federal legislation has severely restricted the use of organo-tin anti-fouling agents. Toxicity concerns appear to be a prime motivation behind this recent legislation. Prior proposals include, for example, Japanese Patents 56156202 and 52117425 report the use of a combination of a napthoquinone and a thiuram disulphide in order to obtain anti-fouling activity, while Japanese Patent 63243067 proposes the use of diphenylamines. Despite these proposals, there still is a substantial need in the anti-fouling arena for new, low toxicity anti-fouling coatings, caulks, and the like.

BROAD STATEMENT OF THE INVENTION

The present invention is addressed to a curable, marine anti-fouling composition of a thermoplastic or thermosetting binder, solvent, non-tin, organo antifouling agent, and optionally conventional additives, e.g. leaching agents, opacifying pigments, etc. The anti-fouling agents are found in preferentially-concentrated domains (hereinafter, often referred to as "PCD" or "PCDs") in the cured compositions. The PCDs can be termed non-homogeneous, phase-separated, or incompatible in the system. The art term used in describing the PCDs of anti-fouling agents is not limitative of the invention as the disclosure herein will demonstrate. Preferably, PCDs are created by forming an oligomeric adduct of the anti-fouling agent which adduct is formed into PCDs upon the curing of the composition. Additional techniques for forming PCDs of anti-fouling agent will be revealed herein.

The present invention also is addressed to the use of new, low toxicity anti-fouling agents which comprise pesticide or herbicide compounds having a X value of between about 0.01 and 3, a Z value for vinyl or aromatic compounds of between about 0.01 and 0.08, and an LD50 value of greater than 200 mg/kg against rats or mice. Such pesticide or algicide compounds broadly can be selected from heterocyclic compounds, aromatic compounds substituted with heteroatom substituents, various amino compounds, carbocyclic vinyl ether ketones, certain phospho compounds, certain polychlorinated carbocyclic and acyclic compounds, certain chlorinated carbocyclic carboxylates, antimony tartrate, boric acid, and cupric oleate. Exemplary aromatic compounds include diaromatic compounds linked with a sigma bond or with a carbon or heteroatom linkage, fused aromatic rings, and mono-aromatic compounds.

Advantages of the present invention include the ability to formulate marine anti-fouling compositions which contain low-toxicity antifouling agents. Another advantage is the ability to formulate marine antifouling coating compositions wherein the low-toxicity anti-fouling agents display improved effectiveness by virtue of being formed in PCDs. These and other advantages will be readily apparent to those skilled in the art based upon the disclosure contained herein.

DETAILED DESCRIPTION OF THE INVENTION

Figure 1:
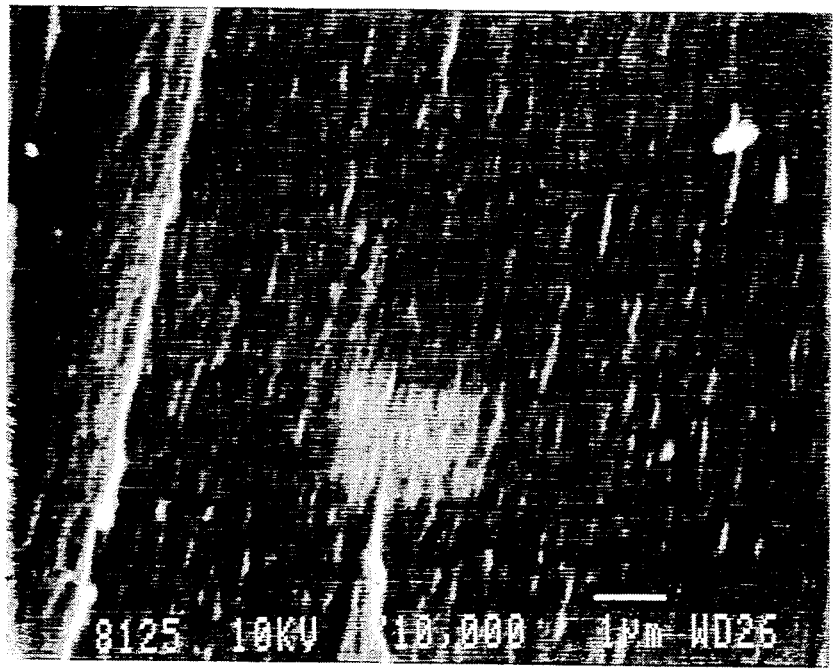
FIG. 1 is a scanning electron micrograph (SEM) at 10,000 X of the cured epoxy resin composition of Example 16 containing an organo toxicant freely-dispersed therein.

With the curtailment in permissible use of organo-tin anti-fouling agents due to their human toxicity characteristics, the art truly needs to enable anti-fouling agents which exhibit low human toxicity characteristics. Once such agents are identified, they must be compatible with remaining formulation ingredients in marine coatings and other marine compositions. Also, these low toxicity anti-fouling agents must display efficacy characteristics making them practical. Use of the non-tin, organo anti-fouling agents in a marine composition will provide a modicum of protection to the substrate to which the composition is applied, yet enhanced, long-term protection is desired. Unexpectedly, it was discovered that enhanced activity for extended periods of time could be achieved by controlling the physical form in which the anti-fouling agents were presented in the cured marine compositions. Phase separation was the term initially used to define such physical form. Later, the term "preferentially-concentrated domains" was adopted due to the variety of techniques developed for achieving the desired physical form of the anti-fouling agents. Thus, islands, pools, or domains where the anti-fouling agents concentrate are created in the cured composition. Such domains typically will be the size of from about $0.3\mu$ to $500\mu$ (micrometers).

Techniques for achieving anti-fouling PCDs initially focused on chemically linking the anti-fouling agent with an oligomer or polymer that phase-separated in the cured composition. This technique has the additional advantage in preventing the anti-fouling agent from prematurely being leached from the cured composition resulting in loss of anti-fouling effectiveness. Other techniques envisioned include, for example, dispersing an anti-fouling agent soluble (or compatible) with a compound which compound itself is incompatible or domain-forming in the continuous phase of the composition. Such incompatible compound forms discrete domains in the cured composition which domains are enriched in the anti-fouling agent compared to the continuous phase of the cured composition. Besides chemically linking the anti-fouling agent with an oligomer or polymer, the anti-fouling agent could complex or otherwise associate with a compound incompatible with the continuous phase of the composition. So long as PCDs of the anti-fouling agent are formed in the cured composition, the precepts of the present invention have been practiced.

Conventional non-tin, organo anti-fouling agents may be used in the present invention for forming PCDs thereof. The preferred non-tin anti-fouling agents useful in the present invention, however, broadly are selected from compounds which have exhibited terrestrial biologic activity, e.g. known herbicides and pesticides. For present purposes, herbicides are to be interpreted broadly as including not only compounds which selectively and/or broadly kill various plant life, but also include various plant growth regulators, algicides, and the like. Pesticides, for present purposes, also should be broadly interpreted as compounds which are selectively and/or broadly toxic or harmful plant infestations, such as acaricides. These compounds, however, must exhibit low toxicity to humans. For present purposes, "low toxicity to humans" is determined when the LD50 value is greater than 200 mg/kg against rats or mice wherein LD50 is defined as the lethal oral dose which is expected to kill 50% of the population of a test group of adult male rats or mice.

Within the broad spectrum of biologically active compounds described above, these compounds also must possess a X factor of between about 0.01 and 3, and a Z value for vinyl or aromatic compounds of between 0.01 and 0.08. The X factor is based upon the McGinniss predictive relationship as defined in *Organic Coatings in Plastic Chemistry,* Vols. 39 and 46, pp 529-543 and 214-223, respectively (1978 and 1982, respectively). The McGinniss predictive relationship defines the X factor as a weight fraction of heteroatoms contained in the monomer or in the monomer repeat unit of an oligomer or polymer. The McGinniss predictive relationship defines the Z parameter as the weight fraction of $\pi$ electrons contained in the monomer or in the monomer repeat unit of an oligomer or polymer (e.g. $\pi$ electron density of aromatic or vinyl compounds). Biologically-active compounds (as defined herein) that possess a X factor and Z parameter within the ranges defined herein, and possess the requisite LD50 value, will be compounds which display anti-fouling characteristics in marine coatings.

Though such compounds will exhibit anti-fouling characteristics, not all may be totally acceptable for all applications such as, for example, some high performance marine coatings requirements, e.g. submarine exterior coatings. Nevertheless, the compounds will possess anti-fouling characteristics and low toxicity to humans which makes their identification significant in the art's efforts at replacing conventional organo-tin anti-fouling agents.

The following biologically-active compounds illustrate the LD50 values, X factor, and Z parameter requirements possessed by the disclosed organo anti-fouling agents/reactants of the present invention and are offered as illustrative of the precepts of the present invention.

TABLE 1

1. 4-allyl-2-methoxyphenol (Eugenol)

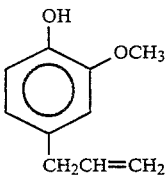

LD50 Value of 2,000 mg/kg (rats)
χ factor (O) of 0.195
Z parameter of 0.05

2. diphenylacetonitrile

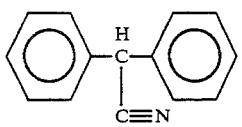

LD50 Value of 3,500 mg/kg (rats)
χ factor (nitrogen) of 0.072
Z parameter of 0.062

3. 2,3-dichloro-1,4-napthoquinone

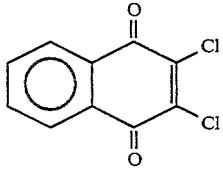

LD50 Value of 1500 mg/kg (rats)
χ factor (Cl) of 0.313
χ factor (O) of 0.141
Z parameter of 0.035

4. cetylpyridinium chloride

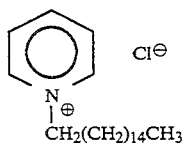

LD50 Value of 200 mg/kg (rats)
χ factor (N) of 0.04
χ factor (Cl) of 0.10
Z parameter of 0.172

5. diphenylamine

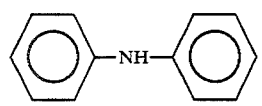

Low mammalian toxicity
χ factor (N) of 0.083
Z parameter of 0.071

6. boric acid

B(OH)3

LD50 of 3,000 mg/kg (rats)
χ factor (O) of 0.777
χ factor (B) of 0.175

7. 2-chloro-N,N-diallylacetamide

TABLE 1-continued

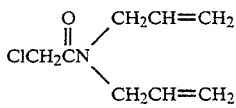

LD50 value of 700 mg/kg (rats)
χ factor (Cl) of 0.205
χ factor (O) of 0.092
χ factor (N) of 0.081
Z parameter of 0.023

8. cetyltrimethylammonium bromide

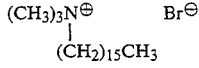

LD50 value of 500 mg/kg (rats)
χ factor (N) of 0.038
χ factor (Br) of 0.22

9. 2-isopropylamino-4-chloro-6-ethylamino triazine

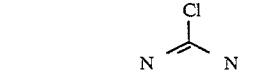

LD50 value of 1869 mg/kg (rats)
χ factor (N) of 0.325
χ factor (Cl) of 0.244
Z parameter of 0.041

10. dimethoxythiophosphate derivative of diphenyl sulfide

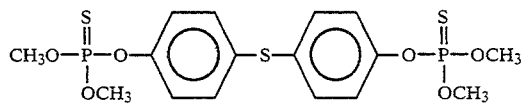

LD50 value of 2030 mg/kg (rats)
χ factor (O) of 0.21
χ factor (S) of 0.21
χ factor (P) of 0.13
Z parameter of 0.013

11. ethyl 4-chloro-alpha(4-chlorophenyl)alpha-hydroxy benzene acetate

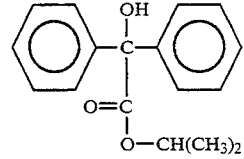

LD50 value of 5,000 mg/kg (rats)
χ factor (O) of 0.18
χ factor (C) of 0.27
Z parameter of 0.022

12. methyl, diethylamino, dimethoxythiophosphate derivative of pyrimidine

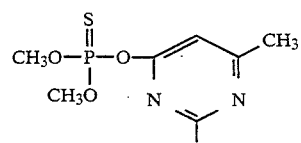

LD50 value of 2,000 mg/kg (rats)
χ factor (O) of 0.16
χ factor (N) of 0.14
χ factor (S) of 0.105
χ factor (P) of 0.102
Z parameter of 0.007

13. ethoxylated nonylphenol

TABLE 1-continued

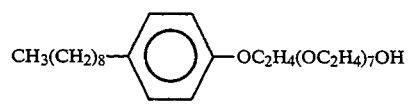

LD50 value of 4,000
χ factor (O) of 0.25
Z parameter of 0.0105

14. unsymmetrical hydrazine derivative of succinic acid

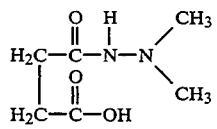

LD50 value of 8400
χ factor (O) of 0.30
χ factor (N) of 0.175

15. allyl, methylhydroxy substituted cyclopententone ester of dimethylpropenyl cyclopropane carboxylic acid

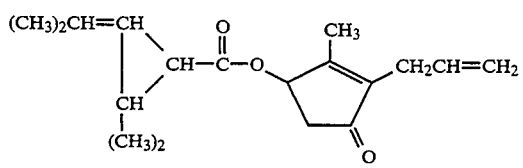

LD50 value of 1,000
χ factor (O) of 0.11
Z parameter of 0.021

16. 2,5-dichloro,3-amino benzoic acid

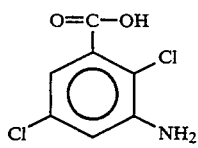

LD50 value of 5,620
χ factor (O) of 0.155
χ factor (N) of 0.068
χ factor (Cl) of 0.345
Z parameter of 0.015

17. cinnamic acid

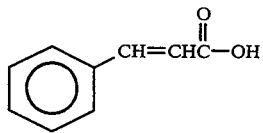

χ factor (O) of 0.216
Z parameter of 0.054

18. 2,-6-dichloro, 4-nitroaniline

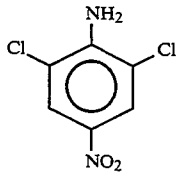

LD50 value of 5,000
χ factor (O) of 0.155
χ factor (N) of 0.135
χ factor (Cl) of 0.343
Z parameter of 0.029

19. dichloro, isopropenyl anilide

TABLE 1-continued

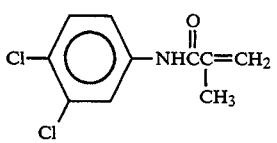

χ factor (O) of 0.070
χ factor (N) of 0.061
χ factor (Cl) of 0.309
Z parameter of 0.035

20. dodecylguanidine monoacetate

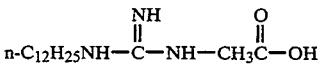

LD50 value of 1,000
χ factor (O) of 0.111
χ factor (N) of 0.146

21. trichlorophenyl acetic acid

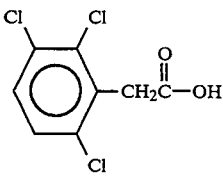

LD50 value of 1,780
χ factor (O) of 0.134
χ factor (Cl) of 0.445
Z parameter of 0.025

22. diphenyl ether, chlorophenyl derivative of the isobutyric acid ester of hydroxyacetonitrile

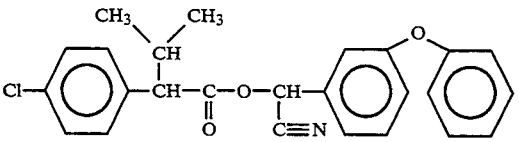

LD50 value of 451 (toxic to fish)
χ factor (O) of 0.114
χ factor (N) of 0.033
χ factor (Cl) of 0.085
Z parameter of 0.043

23. trihydroxybenzoic acid

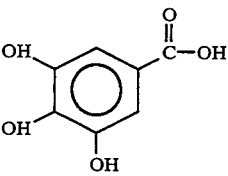

χ factor (O) of 0.471
Z parameter of 0.035

24. 3-indolacetic acid

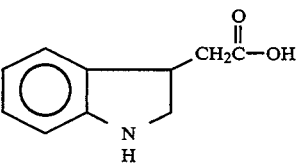

χ factor (O) of 0.198
χ factor (N) of 0.086
Z parameter of 0.037

25. 3,5-dichloro-N-(3,3-dimethylpropyne)benzamide

TABLE 1-continued

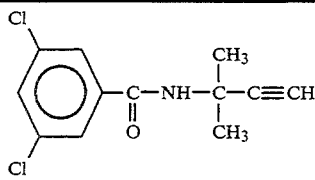

LD50 value (dermal) of 8,350
χ factor (O) of 0.063
χ factor (N) of 0.055
χ factor (Cl) of 0.278
Z parameter of 0.039

26. dimethylphosphoramide ammonium salt

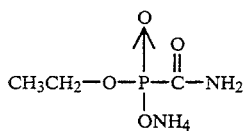

LD50 value (dermal) of 2,400
χ factor (O) of 0.276
χ factor (N) of 0.165
χ factor (P) of 0.182

27. napthalene acetamide

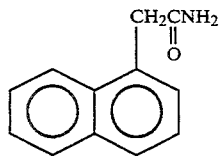

LD50 value of 1,000
χ factor (O) of 0.086
χ factor (N) of 0.076
Z parameter of 0.065

28. dimethylethylphenoxy-cyclohexyl-2-propynyl sulfite

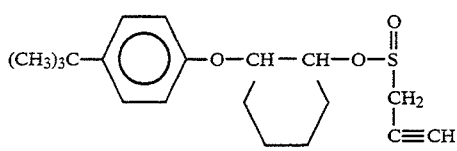

LD50 value of 2,200
χ factor (O) of 0.146
χ factor (S) of 0.098
Z parameter of 0.034

29. o-phenylphenol

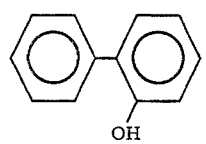

LD50 value of 2,700
χ factor (O) of 0.094
Z parameter of 0.071

30. phthalic acid

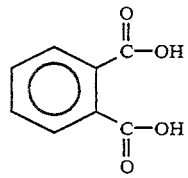

χ factor (O) of 0.386
Z parameter of 0.036

31. chlorophenyl-isopropyl, propynyl carbamate

TABLE 1-continued

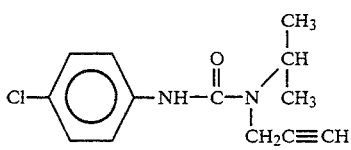

χ factor (O) of 0.064
χ factor (N) of 0.112
χ factor (Cl) of 0.142
Z parameter of 0.040

32. N-phenyl,N-butynyl chloroacetamide

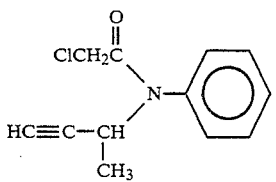

LD50 value of 1,177
χ factor (O) of 0.072
χ factor (N) of 0.063
χ factor (Cl) of 0.160
Z parameter of 0.045

33. amino, chloro, phenyl derivative of azacyclohexamine

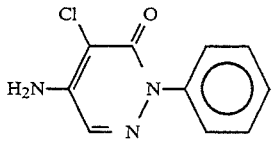

LD50 value of 3,030
χ factor (O) of 0.073
χ factor (N) of 0.190
χ factor (Cl) of 0.161
Z parameter of 0.036

34. N,N-diallyl-2-chloroacetamide

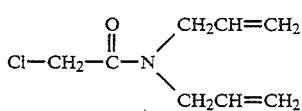

LD50 value of 750
χ factor (O) of 0.092
χ factor (N) of 0.081
χ factor (Cl) of 0.205
Z parameter of 0.023

35. aminoacetic acid derivative of methylphosphonate

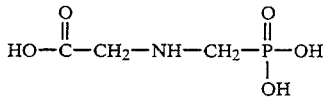

LD50 value of 4,300
χ factor (O) of 0.473
χ factor (N) of 0.083
χ factor (P) of 0.183

36. 3,5-dinitro,4-N,N-dipropylamino benzene sulfonamide

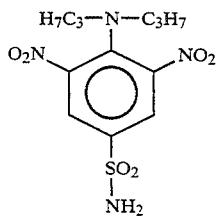

LD50 value of 10,000

TABLE 1-continued

χ factor (O) of 0.277
χ factor (N) of 0.162
χ factor (S) of 0.092
Z parameter of 0.017

37. 2-chloro-2-propenyl diethylcarbamodithioate

```
C2H5    S        Cl
  \     ||       |
   N—C—S—CH2—C=CH2
  /
C2H5
```

LD50 value of 850
χ factor (N) of 0.064
χ factor (S) of 0.294
χ factor (Cl) of 0.163
Z parameter of 0.0092

---

As the data will demonstrate, the foregoing biologically-active compounds display efficacy as anti-fouling agents. Their diminished toxicity to humans is a decided benefit compared to conventional organo-fin anti-fouling agents.

Broadly, the low toxicity anti-fouling agents of the present invention can be described as biologically-active terrestrial compounds (e.g. pesticides and herbicides) that are heterocyclic, aromatic with heteroatomic substituents, amino compounds, and carbocyclic ketone vinyl ethers. The aromatic compounds can be further identified as mono-aromatic, fused aromatic ring compounds, and diaromatic compounds linked with a sigma bond or with a carbon or divalent heteroatomic substituent. In addition to the ring compounds, hetero-substituted aliphatic compounds that are biologically active and possess the requisite X value and Z parameter also may find use as anti-fouling agents in accordance with the precepts of the present invention. Additionally, compounds which do not quite fit any of the foregoing definitions also should be recognized as included within the scope of the anti-fouling agents of the present invention. These include boric acid which has been demonstrated to be quite active as an anti-fouling agent, as the data will testify. Additional compounds include, for example, antimony tartrate and cupric oleate. Illustrative of additional low toxicity antifouling agents/reactants of the present invention include those set forth in Table 2 below.

TABLE 2

Additional candidate low toxicity anti-fouling agents include:
Acrolein phenylhydrazone
Alkyl dimethyl benzene ammonium saccharinate
2-allyl-4-hydroxy-3-methyl-2-cyclopenten-1-one ester of 2,2-dimethyl-3-(2methylpropenyl cyclopropanecarboxylic acid)
4-allyl-2-methoxyphenol
o-(allyloxy) phenyl methylcarbamate
2-(allylthio)-2-thiazoline
1,2,3,4,7,7-hexachloro-5,6-bis(chloromethyl)-2-norbornene
4-ethylamino-6-isopropylamino-2-methylthio-1,3,5-triazine
2-amino-3-chloro-1,4-napthoquinone
3-amino-5-nitro-o-toluamide
3-amino-1,2,4-triazole
ammonium sulfamate
antimony potassium tartrate
2-chloro-4-ethylamino-6-isopropylamino-S-triazine
4-chloro-m-chlorocarbanilate
6-chloropiperonyl chrysanthemumate
N-butyl-N-ethyl-α,α,α-trifluoro-2-6-dinitro-p-toluidine
bis(p-chlorophenyl)-3-pyridine methanol
bis (dialkylphosphinothioyl) disulfide
bis(4-hydroxyiminomethyl pyridinum-1-methyl) ether dichloride
2,4-bis (3-methoxylpropylamino)-6-methylthio-S-triazine
bis (pentachloro-2,4-cyclopentadien-1-yl)
boric acid
N-(4-bromo-3-chlorophenyl)-N'-methoxy-N'-methyl urea
5-(bromomethyl)-1,2,3,4,7,7-hexachloro-2-norbornene
S-(O,O-diisopropyl phosphoro-dithionate of N-(2-mercaptoethyl) benzenesulfonamide benzamidooxyacetic acid
3-benzylideneamino-4-phenylthiazoline-2-thione
bis (p-chlorophenoxy) methane
bis (4-chlorophenyl) disulfide
1,1-bis (p-chlorophenyl) ethane
1,1-bis (p-chlorphenyl)-ethanol
o,o-Dimethyl-o-2,5-dichloro-4-bromophenylthionophosphate
O,O-dimethyl-2,2,2-trichloro-1-n-butyryloxyethyl phosphonate
N-butylacetanilide
2-tert-butylamino-4-chloro-6-ethyl amino-5-triazine
2-tert-butylamino-4-ethylamino-6methylmercapto-S-triazine
4-tert-butyl-2-chlorophenylmethyl methylphosphoramidite
o-(4-tert-butyl-2-chlorophenyl)o-methyl phosphoramidothionate
butyl 3,4-dihydro-2,2-dimethyl-4-oxo-1,2h-pyran-6-carboxylate
n-butyl-9-hydroxyfluorene-(9)-carboxylate
2-(p-tert-butylphenoxy) cyclohexyl 2-propynyl sulfite
1-butyn-3-yl m-chlorophenyl-carbamate
N-trichloro-methylthio-4-cyclohexene-1,2-docarboximide
1-napththyl n-methylcarbamate
S-[[(p-chlorophenyl) thiol]methyl]O,O-diethylphosphorodithioate
2-chloro-N,N-diallyl-acetamide
2-chloroallyl diethyl-dithiocarbamate
cetyldimethylethylammonium bromide
cetyl pyridinium chloride
tetrachloro-p-benzoquinone
2-chloro-4,6-bis(diethylamino)-s-triazine
p-chlorobenzyl p-chlorophenyl sulfide
1,2,3,5,6,-7,8,8-octachloro-2,3,3a,4,7,7a-hexahydro-4,7-methanoindene
1-(3-chlorallyl)-3,5,7-triaza-1-azoniaadamantane chloride
ethyl 4,4'-dichlorobenzylate
5-chloro-2-benzothiazolethiol zinc salt
p-chlorobenzyl p-fluorophenyl sulfide
1-chloro-N'-(3,4-dichlorophenyl) N,N-dimethylformamidine
4-chloro-3,5-dimethyl phenoxy-ethanol
1,4-dichloro-2,5-dimethoxybenzene
1-(chloroo2-norbomyl)-3,3-dimethylurea
S-(p-chloro-α-phenylbenzyl) O,O-diethyl phosphorodithioate
p-chlorophenyl ester of benzene-sulfonic acid
N-3-chlorophenyl-1-(isopropyl-carbamoyl-1)-ethyl carbamate 3-(p-chlorophenyl)-5-methyl rhodanine
4 (and 6)-chloro-2-phenylphenol sodium salt
p-chlorophenyl phenyl sulfone
4-chlorophenyl 2,4,5-trichloro-phenylazosulfide
N-(5-chloro-5-thiazolyl) propionamide
2-[4-chloro-o-tolyl)oxy]propionanilide
2-chloro-1-(2,4,5-trichloro-phenyl) vinyl dimethyl phosphate
N'-(4-chlorophenoxy) phenyl N,N-dimethylurea
Isopropyl N-(3-chlorophenyl) carbamate
Copper (cuprio) oleate
Copper 8-quinolinolate
2-(2,4-dihydroxyphenyl)-1-cyclohexene-1-carboxylic acid-lactone O,O-diethylphosphorothioate
2-chloro-4-dimethylamino-6-methylpyrimidine
3-(2-cyclopenten-1-yl)-2-methyl-4-oxo-2-cyclopenten-1-yl chrysanthemunate
α-cyclohexyl-phenyl-3-pyridyl-methanol, hydrochloride
N'-cyclo-octyl-N,N-dimethylurea
3',4'-dichlorocyclopropanecarboxanilide
2,4-dichlorophenoxyacetic acid
2,4-d,α-chlorocrotyl ester
3,5-dimethyl-1,3,5,2H-tetrahydrothiadiazine-2-thione, tetra-hydro-3,5-dimethyl-2H-1,3,5-thiadiazine-2-thione
4-(2,4-dichlorophenoxy) butyric acid
Dimethyl 2,3,5,6-tetra-chloroterephthalate
decyltriphenylphosphonium-bromochlorotriphenylstannate
dehydroacetic acid (and its sodium salt)
Tris and Bis(2,4-dichlorophenoxyethyl) phosphite
2-methyl-thio-4-isopropylamino-6-methylamino-s-triazine
S-2,3-dichloroallyl N,N-diisopropylthiolcarbamate
1,3-diaza-2,4-cyclopentadiene
N,N-di-n-butyl-p-chlorobenzene-sulfonamide
3,6-dichloro-o-anisic acid
0-(2-chloro-4-nitrophenyl) O,O-dimethyl phosphorothioate
2,6-dichlorobenzonitrile
2,3-dichloro-1,4-naphthoquinone
1,3-bis(1-hydroxy-2,2,2-trichloroethyl) urea
3,4-dichlorobenzyl methylcarbamate (80%) mixture with 2,3-dichlorobenzyl methylcarbamate (20%)
1,1-dichloro-2,2-bis (p-ethylphenyl)ethane
2,4-dichloro-6-(o-chloro-anilino)-s-triazine
N-(dichlorofluoromethylthio)-N'N'-dimethyl-n-phenyl sulfamide
4,4'-dichloro-N-methylbenzene-sulfoanilide
2,3-dichloro-2-methylpropionic acid sodium salt
2,6-dichloro-4-nitroaniline
2,5-dichloro-3-nitrobenzoic acid
5,2'-dichloro-4'-nitro-salicylanilide ethanolamine salt
2',5'-dichloro-4'-nitrososalicylanilide
2,2'-dihydroxy-5,5'-dichlorophenylmethane
1-(2,4-dichlorophenoxyacetyl)-3,5-dimethyl pyrazole
N-3,4-dichlorophenyl N'-5-chloro-2-(2-sodium sulfonyl-4-chlorophenoxy) phenyl urea
2,4-dichlorophenyl ester of benzene sulfonic acid
2,4-dichlorophenyl methanesulfonate
2,4-dichlorophenyl 4-nitrophenyl ether
4-dichlorotetrahydrothiophene 1,1-dioxide
4,4'-dichloro-alpha-trichloromethylbenzhydrol
3',4'-dichloro-2-methacrylanilide
α(Diethoxyphosphinothioylthio) gamma-butyrolactone
O,O-diethyl s-carboethoxymethyl phosphorothioate
O,O-diethyl O-naphthylamido phosphorothioate
O,O-diethyl O-3,5,6-trichloro-2-pyridyl phosphorothioate
2,2'-dihydroxy-3,5,3',5',4''-pentachlorotriphenylmethane 2''-sodium sulfonate
O,O-diisopropyl s-diethyldithiocarbamoyl phosphorodithioate
2,4-dimethylbenzyl 2,2-dimethyl-3-(2-methylpropenyl) cyclopropanecarboxylate
O,O-dimethyl-S-2-(acetylamino)-ethyl dithiophosphate
N-dimethylamino succinamic acid
1,1-dimethyl-3-[3-(n-tert-butyl-carbamoyloxy)phenyl-]urea
O,O-dimethyl s-carboethoxymethyl phosphorothioate
O,O-dimethyl O-(3-chloro-4-nitrophenyl) phosphorothioate
O,O-dimethyl-o-p-cyanophenyl phosphorothioate
o,o-dimethyl-s-[5-ethoxy-1,3,4-thiadiazol-2(3H)-onyl-(3)-methyl]phosphorodithioate
N,N-dimethyl-N'-(2-methyl-4-chlorophenyl)-formamidine hydrochloride
O,O-dimethyl o-(4-nitro-m-tolyl) phosphorothioate
o,s-dimethyl tetrachloro thiotere-phthalate
4'-dimethyltriazenoacetanilide
dinitrocyclohexylphenol
2,4'-dinitro-4-trifluoromethyl diphenylether
2-(1-methylon-heptyl)-4,6-dinitrophenyl crotonate
N,N-dimethyl-2,2-diphenylacetamide
diphenylacetonitrile
diphenylamine
2,6-dinitro-N,N-di-n-propyl-p-toluidine
Di-n-propyl-2,5-pyridine-dicarboxylate
1,1'-ethylene-2,2'-dipyridinium dibromide
2,3-dicyano-1,4-dithia-anthraquinone
3-(3,4-dichlorphenyl)-1, 1-dimethyl-urea
n-dodecyl thiocyanate
n-dodecylguanidine acetate
Ethyl N,N-dipropylthiolcarbamate
2-(2,4,5-trichlorophenoxy)ethyl-2,2-dichloropropionate
ethoxymethylbis (p-chlorophenyl) carbinol
1,2-dihydro-6-ethoxy-2,2,4-trimethylquinone
ethyl-N,N-diisobutyl thiolcarbamate
ethylenebis (dithiocarbamato) zinc
3-phenyl-1,1-dimethylurea trichloroacetate
ferric dimethyl-dithiocarbamate
O,O-dimethyl S-(N-formyl-N-methylcarbamoylmethyl)phosphorodithioate
2-formyl-4-chlorophenoxyacetic acid
3-furfuryl-2-methyl-4-oxo-2-cyclopenten-1-yl chrysanthemunate
2-heptadecyl-2-imidazoline
7-chloro-4,6-dimethoxycoumaran-3-one-2-spiro-1'-(2'-methoxy-6'-methylcyclohex-2'-en-4'-one)
1,1,1,3,3,3,-hexachloro-2-propanone
1,5a,6,9,9a,9b-hexahydro-4a( 4H)-dibenzofuran-carboxaldehyde
9-(p-n-hexyloxyphenyl)-10-methyl-acridinium chloride
2-hydroxymethyl-4-chloro-phenoxyacetic acid
N-hydroxy-methyl-2,6-dichlorothiobenzamide
Isopropyl N-phenylcarbamate
isobomyl thiocyanoacetate isobutyl triphenylmethylamine
5-bromo-3-isopropyl-6-methyluracil
isopropyl-4,4'-diboromobenzilate
isopropyl 4,4'-dichlorobenzilate
isopropyl mercaptophenyl-acetate, O,O-dimethyl phosphorodithioate
3-cyclohexyl-6,7-dihydro-1H-cyclopentapyrimidine-2,4(3H,5H)-dione 3-(3,4-dichlorophenyl)-1-methoxy-1-methylurea
S-[1,2-bis(ethoxy-carbonyl)ethyl]O,O-dimethyl phosphorodithioate
manganese ethylenebisdithiocarbamate
4-chloro-2-methylphenoxyacetic acid
2,6-(4-chloro-2-methylphenoxy) propionic acid
sec-butyl 4(or 5)-chloro-2-methylcyclohexanecarboxylate
s-[(4,6-diamino-s-triazine-2-yl)methyl]O,O-dimethyl phosphorodithioate
2-isopropylamino-4-(3-methoxypropylamino)-6-methylthio-s-triazine
1,1,1-trichloro-2,2-bis(p-methoxyphenyl) ethane
2-methoxy-4-isopropylamino-6-diethylamino-s-triazine
S-(N-methoxymethylcarbamoylmethyl) dimethyl phosphorothiolothiononate
alpha-methylbenzyl 3-(dimethoxy-phosphinyloxy)-cis-crotonate
m-(1-methyl butyl) phenyl methyl-carbamate
methyl-2-chloro-9-hydroxyfluorene-(9)-carboxylate
3,3'-methylenebis (4-hydroxycoumarin)
2,2'-methylenebis (3,4,6-trichlorophenol)
-methyl-2-oxo-1,3-dithio(4,5-b)quinoxaline
O,O-dimethyl S-(2,5-dichlorophenyl-thio)-methyl phosphorodithioate
(2-methylpiperidino)propyl-3,4-dichlorobenzoate
6-(methylsulfonyl)-2,6-dinitro-n,n-dipropylaniline
methyl-2,3,5,6-tetrachloro-n-methoxy-n-methylterephthalamate
O-methyl O-(2,4,5-trichloro-phenyl) amidophosphorothiomate
3-(p-bromophenyl)-1-methyl-1-methoxyurea
1,2-dihydropyridazine-3,6-dione
3,3'-ethylenebis-(tetrahydro-4,6-dimethyl-2H-1,3,5-thiadiazone-2-thione)
S-ethyl hexahydro-1H-azepine-1-carbothioate
3-(p-chlorphenyl)-1,1-dimethylurea
3-(p-chlorophenyl)-1,1-dimethylurea trichloroacetate
disodium ethylene bisdithiocarbamate
1,2-dibromo-2,2-dichloroethyl dimethyl phosphate
beta-naphthoxyacetic acid
3-(3,4-dichlorophenyl)-1-methyl-1-n-butylurea
3-(hexahydro-4,7-methanoindan-5-yl)-1,1-dimethylurea
N-1-naphthyl-phthalamic acid p-chlorophenyl
p-phenyl 4-chlorobenzenesulfonate
s-propylbutyl-ethylthiocarbamate
phenothiazine
ethyl mercapto-phenylacetate O,O-dimethyl-phosphorodithioate
n-phenyl-1-(ethylcarbamoyl-1) ethylcarbamate (d isomer)
phosphoric acid, 2-chloro-1-(2,4,5-trichlorophenyl)vinyl dimethyl ester
4-amino-3,5,6-trichloropicolinic acid
piperonyl-bis(2-[2'-n-butoxyethoxy]ethyl) acetal
piperonyl butoxide alpha[2-(2-n-butoxyethoxy)-ethoxy]4,5-methylenedioxy 2-propyltoluene
piperonyl cyclonene polychlorobenzoic acid, dimethylamine salt
2,4-bis-(isopropylamino)-6-methoxy-s-triazine
2-methyl-mercapto-4,6-bis(isopropylamino)-s-triazine
2-chloro-n-isopropylacetanilide
3',4'-dichloropropionalide
2-chloro-4,6-bis(isopropyl-amino)-s-triazine
di-n-propyl-3-methyl-6,7-methylenedioxy-1,2,3,4-tetrahydronaphthalene-1,2dicarboxylate
5-amino-4-chloro-2-phenyl-3(2H) pyridazinone
pyrethrin I
8-quinolinol
dimethyl 2,4,5-trichlorophenyl phosphorothionate
salicylanilide
1-(3,4-methylene-dioxyphenoxy)-3,6,9-trioxoundecane
sodium 2-(2,4-dichlorophenoxy)ethyl sulfate
1-(2-methyl-cyclohexyl)-3-phenylurea 1-(2,4,5-trichlorophenoxy) propionic acid
N'-chlor-2-methyl-p-valerotoluidide
1,2-methylenedioxy-4-[2-(octylsulfinyl)propyl]benzene
methyl 3,4-dichlorocarbanilate
2,4,5-trichlorophenoxyacetic acid
trichlorobenzyl chloride
2,2-bis(p-chlorophenyl)-1,1-dichloroethane
ethylene-1,2-bis (thiocarbamoyldimethylthio-carbamoyldisulfide)
3-tert-butyl-5-chloro-6-methyluracil
2,6-di-tert-butyl-p-tolylmethylcarbamate
2,3,6,7-tetrachloro-4a,8a-epoxy-1,2,3,4,4a,8a-hexahydro-1,4-methanonaphthalene 5,8-dione
N-(1,1,2,2-tetrachloro-ethyl-sulfenyl)-cis-α-4-cyclohexene-1,2-dicarboximide
2,4,5,6-tetrachloroiso-phthalonitrile
1,2,4,5-tetrachloro-3-nitrobenzene
p-chlorophenyl 2,4,5-trichlorophenyl sulfone
5,6,7,8-tetrahydro-1-naphthyl methylcarbamate
3,4,5,6-tetrahydrophthalimidomethyl 2,2-dimethyl-3-(2-methylpropenyl) cyclopropanecarboxylate
O,O,O',O'-tetramethyl O,O'-thiodi-p-phenylene phosphorothioate
1,3,6,8-tetranitrocarbazole
2-(4-thiazolyl) benzimidazole
2,2'-thiobis(4,6-dichlorophenol)
2-thiocyanoethyl dodecanoate
2,3-quinoxaline-dithiol cyclic trithiocarbonate
tetramethylthiuram disulfide
N-meta-tolyl phthalamic acid
S-2,3,3-trichloroallyl N,N-di-isopropyl-thiolcarbamate
O,O-dimethyl (1-hydroxy-2,2,2-trichloroethyl)phosphonate
2,3,6-trichlorobenzoic acid
trichlorobenoic acid, dimethylamine salt
4,5,7-trichlorobenzthiadiazole-2,1,3
2,3,6-trichlorobenzyloxypropanol
N-trichloromethylthio-benzothiazolone
N-trichloromethylthiobenzoxazolone
2,2,2-trichloro-n-(pentachloro-phenyl)acetimidoyl chloride
2-(2,4,5-trichlorophenoxy)ethyl sulfate, sodium salt
N,N'-N"-trichloro-2,4,6-triamine-1,3,5-triazine
2-chloro-4-(di-ethylamino)-6-(ethylamino)-s-triazine
tert-butyl 4(or 5)-chloro-2-methylcyclohexanecarboxylate
S-propyldipropylthiocarbamate zinc ethylene bisdithiocarbamate
zinc dimethyldithiocarbamate
3,5-dinitro-o-toluamide.

Linking of the anti-fouling agent with an oligomer or polymer can be accomplished by a variety techniques, depending upon the available functionality of the anti-fouling agent. For example, ethylenic unsaturation in the anti-fouling agent can be copolymerized with acrylate or other ethylenically-unsaturated monomers in conventional fashion. See, for example, *Acrylic Monomer*, product literature, Dow Badishce Company, Form No. A-GB-101; *Preparation, Properties and Uses of Acrylic Polymers*, product literature, Rohm and Haas Company, Form CM-19 B/eh; and U.S. Pat. No. 4,566,962, the disclosures of which are expressly incorporated herein by reference. Anti-fouling agents with reactive hydroxyl or other active hydrogen functionality (e.g., —NH, —NH₂, —SH, or the like) can be reacted with a polyisocyanate for forming an anti-fouling agent adduct. See, for example, *Macromolecular Synthesis*, C. G. Overberger, Editor, Vol. 1, pp 69–74, John Wiley & Sons, Inc., New York, N.Y. (1963), the disclosure of which is expressly incorporated herein by reference. Additional reactions will be readily apparent to those skilled in such art, as stated above, depending upon the reactive functionality in the anti-fouling agent.

Additional techniques for forming PCDs include, for example, complexing (association or other mechanism) of the anti-fouling agent with another ingredient in the formulation, e.g., pigment, polymer or oligomer additive, or the like. Another technique involves the anti-fouling agent being relatively more miscible in a discontinuous phase (or particles), than in the continuous phase of the coating. Again, PCDs would be formed. Regardless or the technique, so long as PCDs of the anti-fouling agent are formed in the final product, improved long-term anti-fouling activity will be expressed by the anti-fouling agents.

The formulation of the marine compositions containing the anti-fouling agents of the present invention is practiced in conventional fashion as those skilled in the art appreciate utilizing conventional film-forming binders appropriate for marine environments. Marine compositions broadly for present purposes include, for example, coatings, elastomers, sealants, caulks, grouts, concretes, and like polymeric structures appropriate for the marine environment. The form of the marine composition can be as a coating, as rigid or elastomeric (including foamaceous) objects, as a sealant, or as a three-dimensional configured structure such as villous trailing fingers in the exterior of marine vessels. Conventional additives, organic solvents (including reactive solvents or diluents), and the like are incorporated into the formulation. The proportion of anti-fouling agent generally is between about 1 and 20 weight percent by weight of the formulation.

The following examples show how the present invention has been practiced but should not be construed as limiting. In this application, all percentages and proportions are by weight and all units are in the metric system, unless otherwise expressly indicated. Also, all citations are expressly incorporated herein by reference.

EXAMPLES

Example 1

In order to bind an organic anti-fouling agent into a polymeric structure, a three-neck reaction flask fitted with a mechanical stirrer, thermometer, and reflux condenser was charged with a polysulfide polymer (200 g of LP-3 polysulfide polymer, Thiokol), 1,2-dicyano, tetrachlorobenzene (100 g of Nopocide brand, Diamond Shamrock), potassium hydroxide (80 g), and dimethyl sulfoxide (100 ml). The reaction mixture was heated for three hours to a temperature of 105° C., cooled to room temperature, washed, and subjected to vacuum for removal of solvent. The resulting polymeric structure 45701-1 can be represented conventionally as follows:

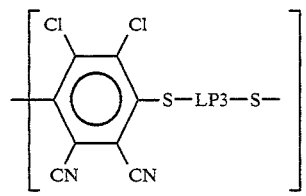

Example 2

An anti-fouling agent-modified adduct was synthesized in accordance with the following reaction scheme. Toluene (100 ml) was added to a roundbottomed flask followed by the addition of hydroxyethyl methacrylate (14 ml) and toluene diisocyanate (17 ml). This mixture was stirred for one hour at room temperature followed by the addition of triethylamine catalyst (three drops). After two hours, 3,4-dichloroanaline (16 ml) was added to the solution which then was heated to 50° C. and held for 10 hours. The resulting solid product was filtered through number 40 filter paper and washed with additional alliquots of toluene and hexane. Infrared analysis showed the expected urethane-amide structures consistent with the desired reaction product 45701-3 which is illustrated conventionally below.

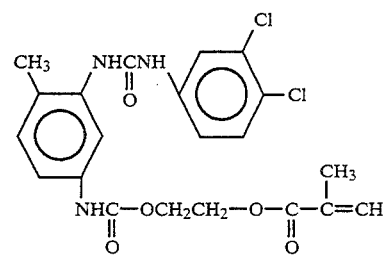

Example 3

A pressure reactor fitted with a pressure gauge was loaded with 3(3,4-dichlorophenyl)-1,1-dimethyl urea (45 g) and propylene oxide (150 ml). The reactor was sealed and heated to 80 C. (a pressure reading of 50 psi) and held for 20 hours. The sample removed from the reactor was analyzed by IR and showed broadening of the NH bands and the presence of hydroxyl functionality and some polyether functionality (1100 cm−1). Preparation of this material is similar to that preparation described in *J. Polymer Science*, vol. 15, 427–446 (1955). Reaction production 45701-4 can be represented conventionally below. It will be observed that the reaction product contains a hydroxyl group which could be reacted with isocyanate or other functionality for its incorporation into a curable resin.

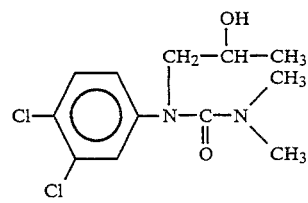

Example 4

To 1,4,5,6,7,7-hexachloro-5-norborene-2,3-dicarboxylic anhydride (37 g) was added hydroxyethyl methacrylate (37 ml). This reaction mixture was heated to 87° C. for three hours to produce reaction product 45701-5 which can be represented conventionally as follows:

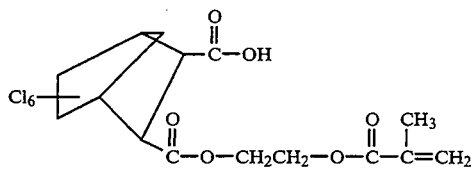

Example 5

Addition of a 10% solution of CuCl$_2$ in ethanol to a 10% solution of 8-hydroxyquinoline formed a dark brown complex immediately. This complex 45701-6 was washed with hexane and dried without further purification. The structure of the complex can be represented conventionally as follows:

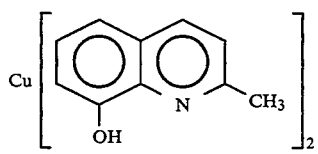

Example 6

The procedure of Example 2 was repeated using 2,5-dichloroanaline instead of 3,4-dichloroanaline. Reaction product 45701-7 is illustrated below:

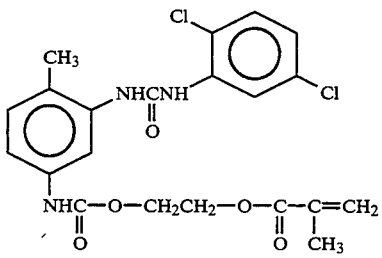

Example 7

1,5-napthalene diisocyanate (25 g) was reacted with 1,3-diaza-2,4cyclopentadiene (14 g) using the urethane reaction procedure as set forth in Example 2. The resulting reaction product 45701-8 is represented conventionally below:

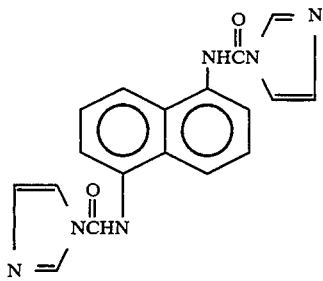

Example 8

To DER 331 epoxy resin (Dow epoxy resin, about 300 molecular weight, epoxide equivalent of 150, 33 g, The Dow Chemical Company, Midland, Mich.) was added 35 ml of toluene and phenothiazine (40 g). This mixture was heated to 90° C. for three hours until a clear solution was obtained. The product was used without any further purification. Reaction product 45701-8 can be illustrated conventionally below:

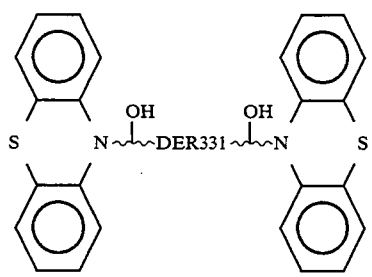

Example 9

Two different modified polymeric structures were prepared. Polymeric structure 45701-10 was prepared by adding DER 331 resin (11 g) to 2-mercaptobenzothiazole (10 g) dissolved in toluene solvent (35 ml). This reaction mixture was heated to 90° C. for three hours until a clear solution was obtained. The second polymeric structure identified as 45701-11 was prepared by the same reaction procedure utilizing morpholine in place of 2-mercaptobenzothiazole. Both structures can be represented conventionally below.

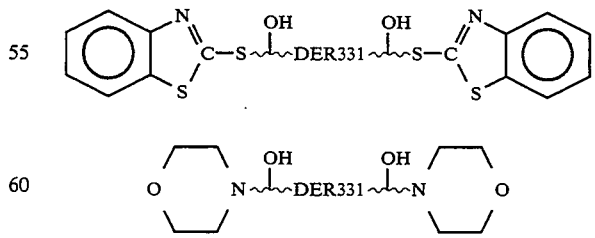

Example 10

In order to demonstrate the affect which PCDs of organo anti-fouling display, anti-fouling formulations (Control Paint) were compounded as follows:

TABLE 1

| Ingredient | Amount (wt-parts) | |
|---|---|---|
| | #1 | #2 |
| Laroflex MP-45 copolymer of vinyl chloride and vinyl isobutyl ether (75/25), BASF Wyandotte | 3 | 3 |
| Rosin | 10 | 10 |
| Epikote 828 X90 (bis-phenol A epoxy resin, Celanese Specialty Chemicals) | 0.1 | 0.1 |
| Red Iron oxide | 5 | 5 |
| Silica | 20 | 20 |
| Nopocide (1,2-dicyano-tetra-chlorobenzene) | 20 | — |
| Anti-fouling agent 45701-1 (Example 1) | — | 20 |
| Bentone 34 | 1 | 1 |
| Xylene | 50 | 50 |

Test panels were 15.24 cm × 30.48 cm (6 in × 12 in) in dimension and were constructed of a white plastic top surface and a black plastic bottom surface. The test panels were coated on both sides with the two formulations above-tabulated at a film thickness of about 5 mils dry. The test panels then were exposed horizontally with the white surface upward and the black surface downward in the ocean at Daytona Beach, Fla., U.S.A. A control panel consisted of 12 wt-% triphenyl tin hydroxide dispersed in a resinous vinyl binder (80 wt-parts of a vinyl chloride polymer, VAGH brand, Union Carbide Corporation, New York, N.Y.) reduced in methyl ethyl ketone solvent to 50% solids content. After exposure, the control and test panels were inspected and assigned a numerical rating from 0 to 10 based on the amount of surface area of the panel that was free from fouling, a rating of "10" corresponding to perfect protection. The following results were recorded.

| Sample | Rating After Exposure * | |
|---|---|---|
| | 4 Months | 462 Days |
| Control Paint- No Anti-Fouling Additive | 0 | 0 |
| Control Paint- Nopocide Freely Added at 20 wt-% | 0 | 0 |
| Control Paint- Polymeric Additive 45701-1 at 20 wt-% | 9 | 7 |

* 10 is perfect protection

That the above-tabulated results demonstrate that the polymeric anti-fouling agent displayed improved panel protection compared to the same agent added neat to the marine paint formulation. As later examples will confirm, the polymeric anti-fouling agent was in the form a PCDs in the cured paint.

Example 11

The Control Paint of Example 10 was formulated with additional polymeric and as-is anti-fouling additives and evaluated as in Example 10, with the following results being recorded:

TABLE 3

| Sample (Additive at 20 wt-%) | Rating After Exposure * | |
|---|---|---|
| | 4 Months | 462 Days |
| Control Paint No Anti-Fouling Additive | 0 | 0 |
| Control Paint- 3,4-Dichloroaniline | 0 | 0 |
| Control Paint- 2,5-Dichloroaniline | 0 | 0 |
| Control Paint- 2,6-Dichloro-4-Nitroaniline | 0 | 0 |
| Control Paint- 3,4-Dichloroaniline Polymer of Example 2 | 5–6 | 5–6 |
| Control Paint- 2,5-Dichloroaniline Polymer of Example 8 | 1–2 | 1 |
| Control Paint- 2,6-Dichloroaniline-4-Nitroaniline Polymer like that of Example 6 | 7–9 | 7 |

Again, these results demonstrate the unexpected efficacy of PCD organo anti-fouling agents.

Example 12

The Control Paint of Example 10 was formulated with additional anti-fouling additives and evaluated with the following results being recorded:

TABLE 4

| Sample (Additive at 20 wt-%) | Rating After Exposure * 4 Months |
|---|---|
| Control Paint- No Anti-Fouling Additive | 0 |
| Control Paint- Hexachloro-5-Norborene-2,3-Dicarboxylic Anhydride | 0 |
| Control Paint- Hexachloro-5-Norborene-2,3-Dicarboxylic Anhydride Polymer of Example 4 | 3–4 |
| Control Paint- Phenothiazine | 0 |
| Control Paint- Phenothiazine Polymer of Example 8 | 0–1 |
| Control Paint- 50/50 Weight Mixture of 2-Mercapto-benzothiazole and Morpholine | 0 |
| Control Paint- 50/50 Weight Mixture of 2-Mercapto-benzothiazole and Morpholine Polymer of Example 11 | 1 |

Example 13

The Control Paint of Example 10 again was formulated with additional anti-fouling additives and evaluated as above with the following results being recorded:

TABLE 5

| Sample (Additive at 20 wt-%) | Rating After Exposure * | |
|---|---|---|
| | 1 Months | 4 Months |
| Control Paint- 3,5-Dichloro-N-(3,3-Dimethylproyne) Benzamide or Pronamide of Example 10 | 0 | 0 |
| Control Paint- Pronamide Polymerized with 50/50 Methylmethacrylate and Butyl Acrylate | 7 | 7 |
| Control Paint- d-Trans-Allerthrin of Example 10 | 0–1 | 0 |
| Control Paint- d-Trans-Allerthrin Polymerized | 7 | 7 |

TABLE 5-continued

| Sample | Rating After Exposure * | |
|---|---|---|
| (Additive at 20 wt-%) | 1 Months | 4 Months |
| with 50/50 Methylmethacrylate and Butyl Acrylate | | |

Yet again, the efficacy of the PCD polymeric anti-fouling agents is demonstrated.

Example 14

The Control Paint of Example 10 was formulated with additional anti-fouling additives and evaluated with the following results being recorded:

TABLE 6

| Sample | Rating After Exposure * | |
|---|---|---|
| (Additive at 20 wt-%) | 1 Months | 4 Months |
| Control Paint- 3-(3,4-Dichlorophenyl)-1,1-dimethyl urea (See Example 3) | 9 | 0 |
| Control Paint- Urea of Above Attached to Urethane Prepolymer of 2 Moles of Toluene Diisocyanate and Polypropylene Glycol (200 Molecular Weight) | 9 | 7 |
| Control Paint- Reaction Product of 1,5-Naphthalene Diisocyanate and 1,3-Diaza-2,4-Cyclopendadiene (See Example 7) | 6–7 | 0 |
| Control Paint- Cyclopendadiene above Polymerized with 2 Moles of Naphthalene Diisocyanate and 1 Mole of Ethylene Glycol | 6–7 | 6–7 |

The above-tabulated results further confirm the invention.

Example 15

Testing of several additional anti-fouling agents in the paint formulation described in Example 12 was conducted for 6 months and the results compared to several polymerized versions of the same anti-fouling agents, with the following results being recorded:

TABLE 7

| Panel # | Anti-Fouling Agent | General Rating | | | |
|---|---|---|---|---|---|
| | | 1 Mo. | 4 Mos. | 6 Mos. | 6 Mos.* |
| 13-A1 | Eugenol** | 9 | 3 | 0 | 6 |
| 13-A2 | Eugenol** | 7 | 3 | 0 | 6 |
| 13-C1 | 2,3-Dichloro-1,4-Naphthaquinone | 7 | 6 | 0 | 5 |
| 13-C2 | 2,3-Dichloro-1,4-Naphthaquinone | 5 | 3 | 0 | 5 |
| 13-E1 | Diphenylanaline | 5 | 4 | 0 | 6 |
| 13-E2 | Diphenylanaline | 5 | 3 | 0 | 6 |
| 14-C1 | N,N-diallyl-2-chloroacetamide | 5 | 4 | 0 | 4–6 |
| 14-C2 | N,N-diallyl-2-chloroacetamide | 5 | 4 | 0 | 4–6 |
| Control | Uncoated Panel | 0 | 0 | 0 | 0 |

*Free-radical polymerized version prepared as reported in Examples 2, 4, or 6; or urethane version prepared as reported in Example 2, depending on the functionality of the anti-fouling agent.
**Eugenol is 99% 4-allyl-2-methoxyplhenol.

Example 16

An epoxy resin system was examined for its ability to be modified so as to preferentially influence the concentration or location of an anti-fouling agent (Nopocide N-96, see Example 1) within its structure. A direct comparison was made between an epoxy resin (EPON 828 epoxy resin, diglycidyl ether of bis-phenol A, Shell Chemical Company) and the same epoxy resin containing a domain structuring polymeric material, such as a polysulfide resin (LP-32 polysulfide resin, Thiokol Corporation). Both systems contained the same anti-fouling agent. The compositions formulated are set forth below:

TABLE 8

| Ingredient | Sample (g) | | |
|---|---|---|---|
| | 1 | 2 | 3 |
| Epon 828 | 9 | 6 | 9 |
| LP-32 | — | 3 | — |
| Hexachlorophene | 1.41 | 1.29 | — |
| Polymer of Nopocide N-96 and LP-32 polysulfide (3 parts LP-32 and 1.24 parts Nopocide) | — | — | 1.7 |
| Ancamine AD* | 5.10 | 3.4 | 5.10 |

*Amine hardner, 485 amine value, Pacific Anchor Corp.

Figure 2:
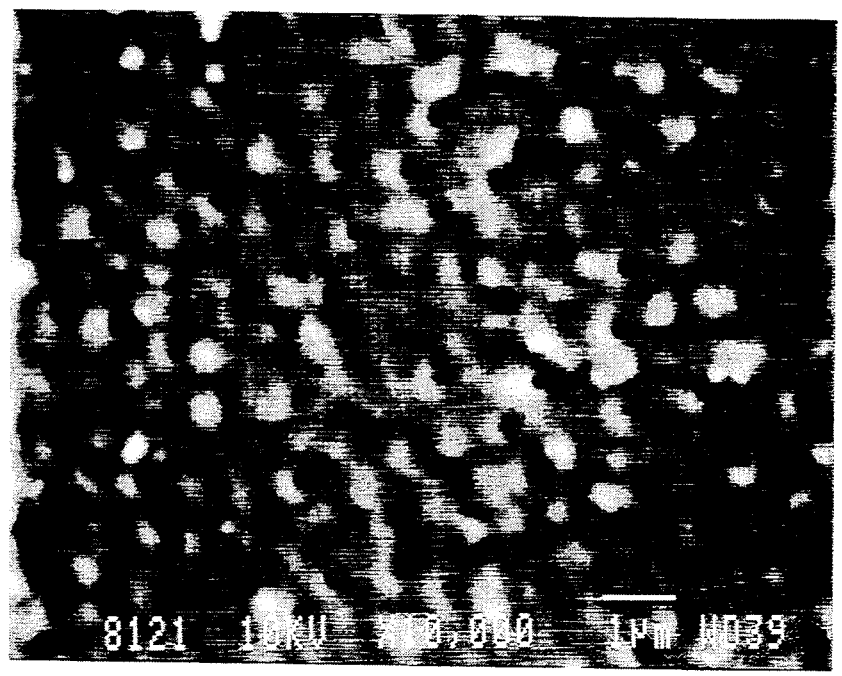
FIG. 2 is an SEM at 10,000 X of a cured epoxy resin composition of Example 16 containing the same organo toxicant free-dispersed therein and a domain-forming polysulfide polymer.

Sample 1 that contained only the hexachlorophene anti-fouling agent and not the domain creating polymer (LP-32 polysulfide), provided an even chlorine distribution throughout the surface of the sample. Sample 1 also showed no regular domain size structure present as can be seen by reference to FIG. 1. Sample 2, however, exhibited a very unique regular domain size (less than 1μ) structure or pattern which was created by the LP-32 polysulfide polymer (see FIG. 2).

Figure 3:
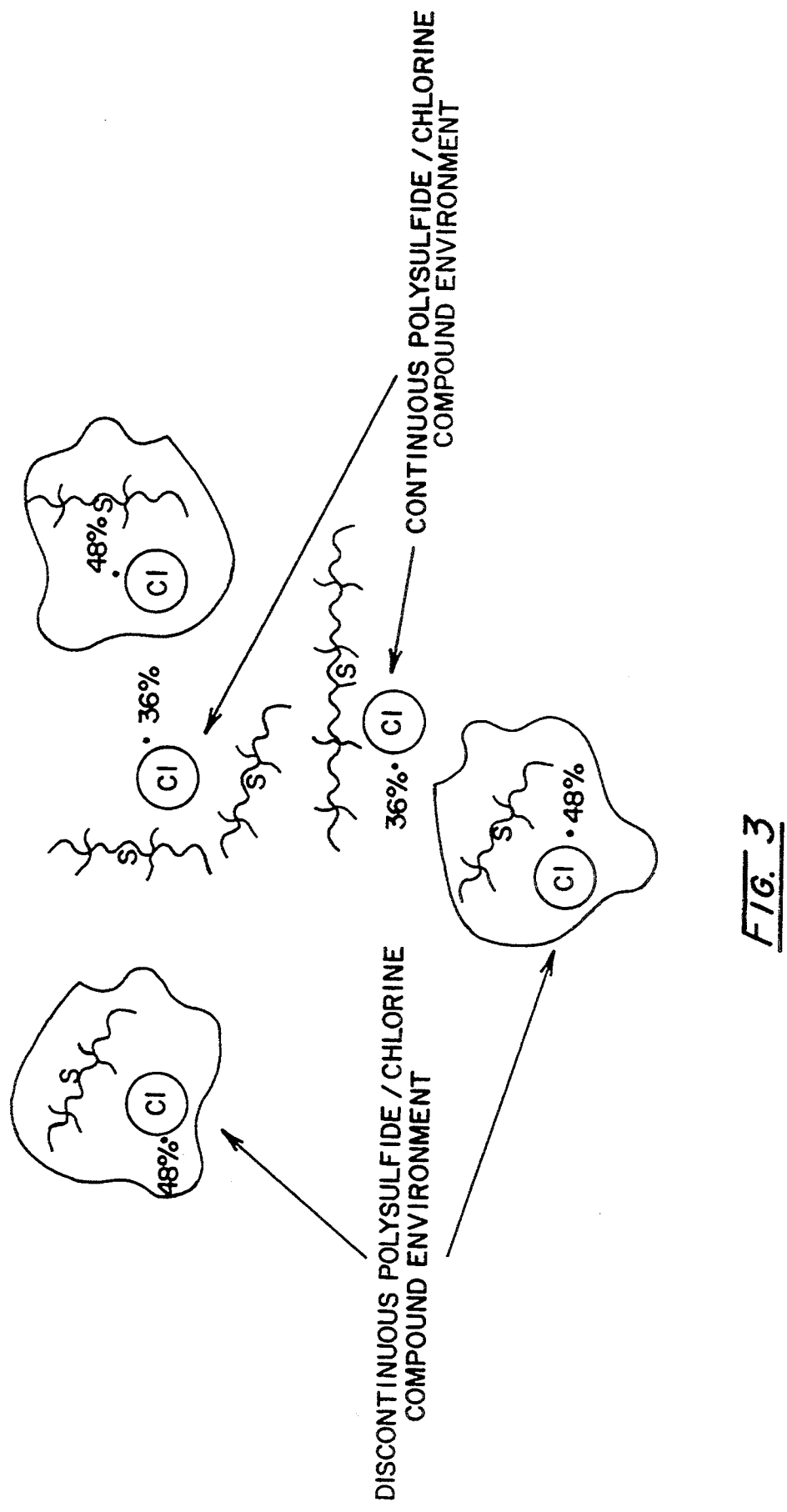
FIG. 3 is a pictorial representation of the SEM results of FIG. 2.

Engergy Dispersion Spectoscopy (EDS) analysis of the sample surface for chlorine from the hexachlorophene anti-fouling agent showed that there were two distinct domains or regions where the chlorine could be found. Chlorine was identified in both the sea-like structures and the small round island structures in the sample (FIG. 2) What was unexpected, however, was the discovery that the chorine concentration, and, thus, the concentration of anti-fouling agent, was significantly higher (48%) in the round island domains and lower (36%) in the sea-like domains of the sample. A pictorial representation of these results is displayed in FIG. 3.

Figure 4:
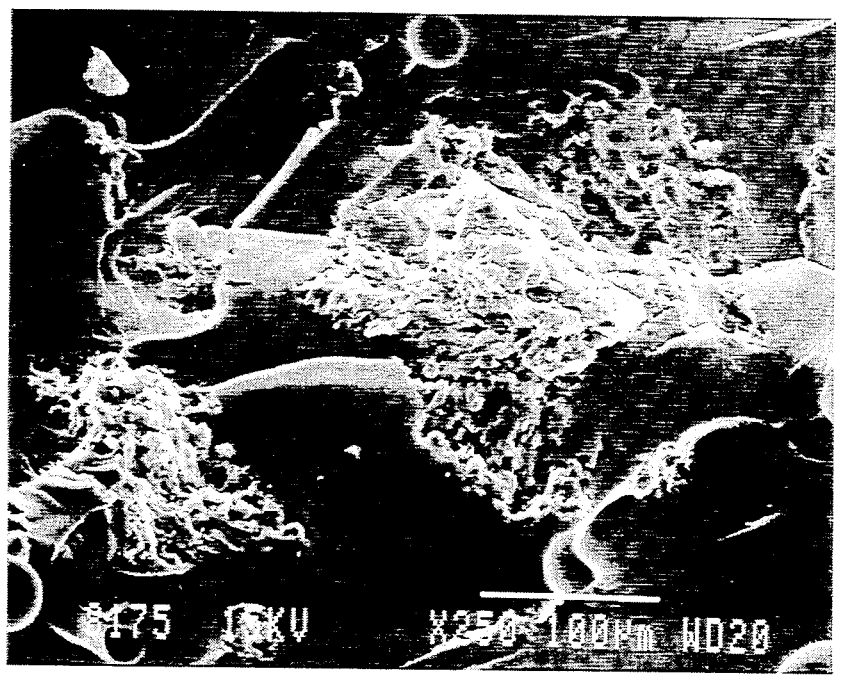
FIG. 4 is an SEM at 250 X of a cured epoxy resin composition of Example 16 containing a polymer of the same organo toxicant and the polysulfide polymer of FIG. 2 which product forms discrete domains.
Figure 5:
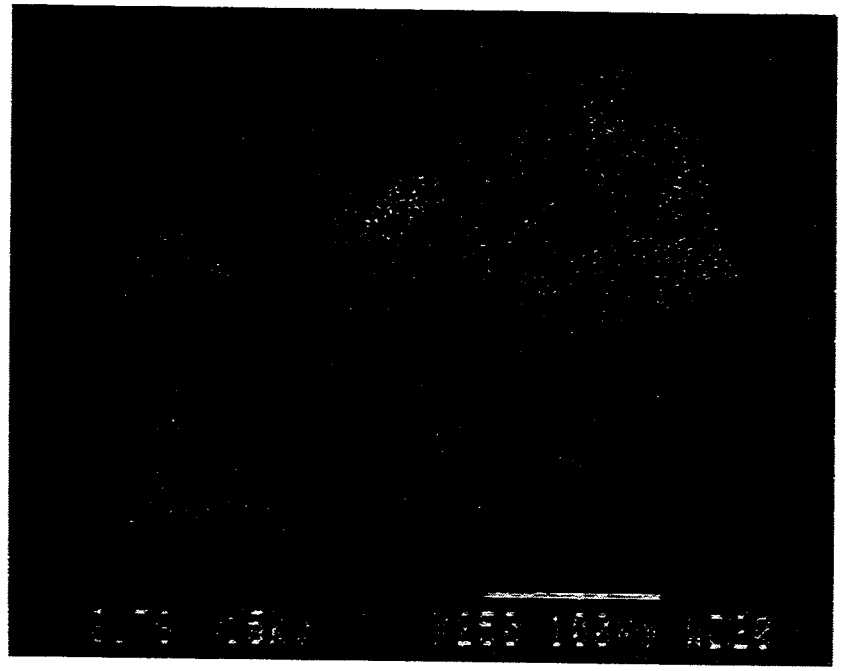
FIG. 5 is an Energy Dispersion Spectroscopy analysis for the chlorine content of the organo toxicant polymer domains of FIG. 4.
Figure 6:
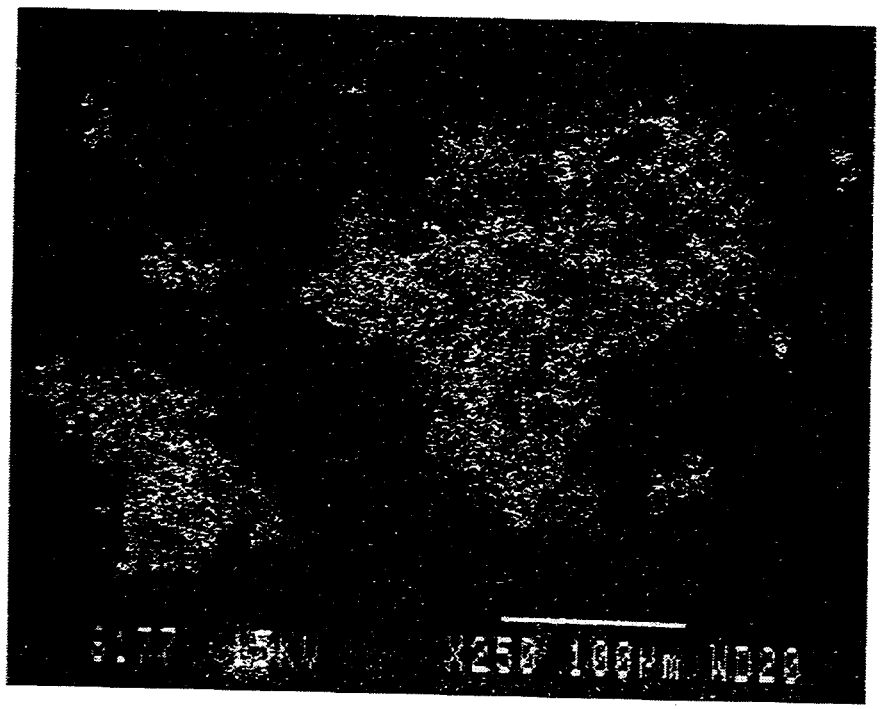
FIG. 6 is an Energy Dispersion Spectroscopy analysis for the sulfur content of the organo toxicant polymer domains of FIG. 4.

Similar results were observed for Sample 3. Sample 3 contained larger domain size structures (about 100μ), and chlorine from the Nopocide was found only in the areas where the domain or island was located. Areas between the islands did not contain chlorine. A chlorine or sulfur density map of the sample surface follows the outline of the domain structure (see FIGS. 4, 5, and 6).

Example 17

In this example, an unreacted toxicant was evaluated with respect to its ability to preferentially concentrate in domains of another material created within a continuous polymeric binder or carier. For example, certain types of acrylic copolymers dispersed in a polyvinyl chloride (PVC) polymer can create discrete domains wherein a toxicant molecule can preferentially concentrate. In this case, the toxicant was the 3,4-dichloroanaline-based acrylate monomer of Example 2 (80 wt-% concentration, sharp melting point at 180° C.), the continuous phase was VAGH PVC polymer (see Example 10), and the domain-creating polymer was a mixture of polyhydroxyethylmethacrylate (10 wt-% concentration, melting point less than 250° C.), and a polymer of a methacrylic acid ester of an amino carbamate monomer (10 wt-% concentration, melting point greater than 300° C.).

Figure 7:
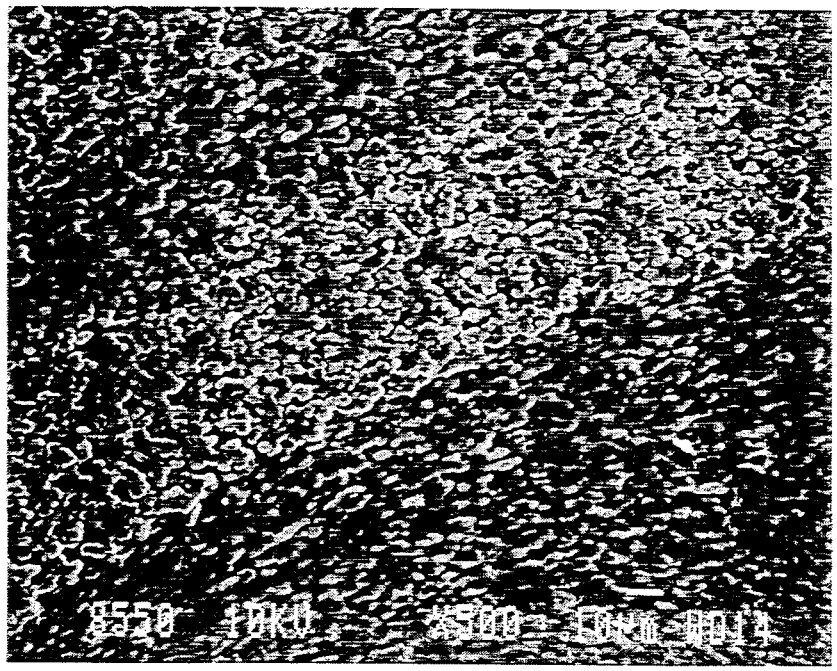
FIGS. 7 and 8 are SEMs at 500 X and 2,500 X, respectively, showing the domain structures formed in a continuous PVC binder by the domain creating acrylic polymers and organo toxicant monomer described in Example 17.
Figure 8:
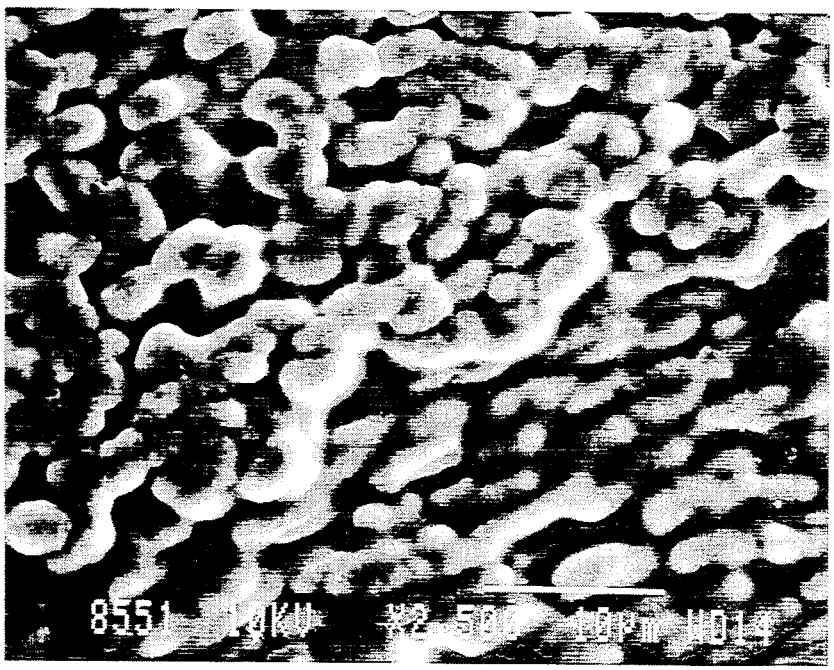
Figure 9:
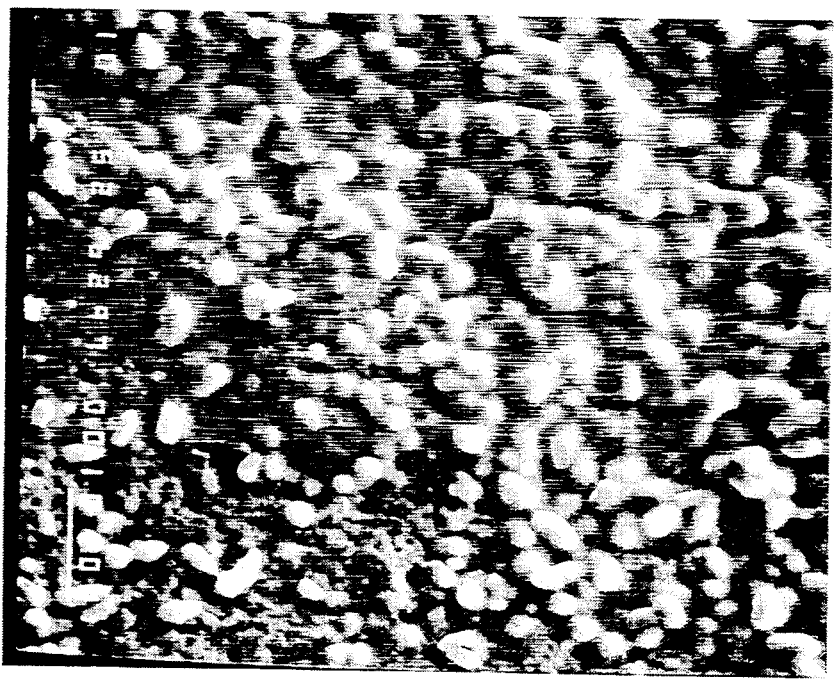
FIG. 9 is an optical micrograph (SEM) at 1,500 X of the sample of FIGS. 7 and 8.
Figure 10:
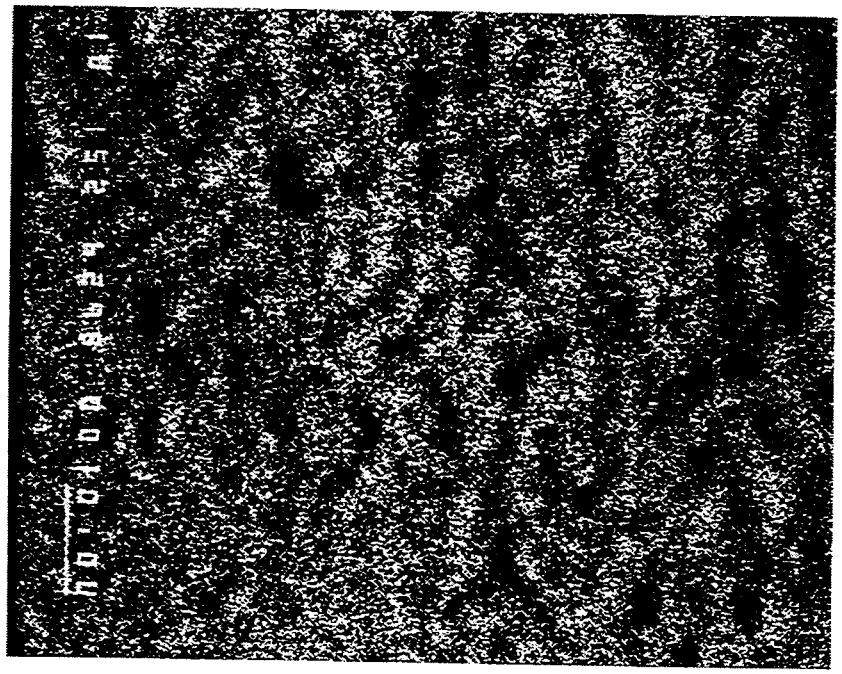
FIG. 10 is an Energy Dispersion Spectroscopy analysis at 1,500 X for the oxygen content of the sample of FIGS. 7-9.
Figure 11:
FIG. 11 is an optical micrograph at 2,000 X of the sample of FIGS. 7 and 8.
Figure 12:
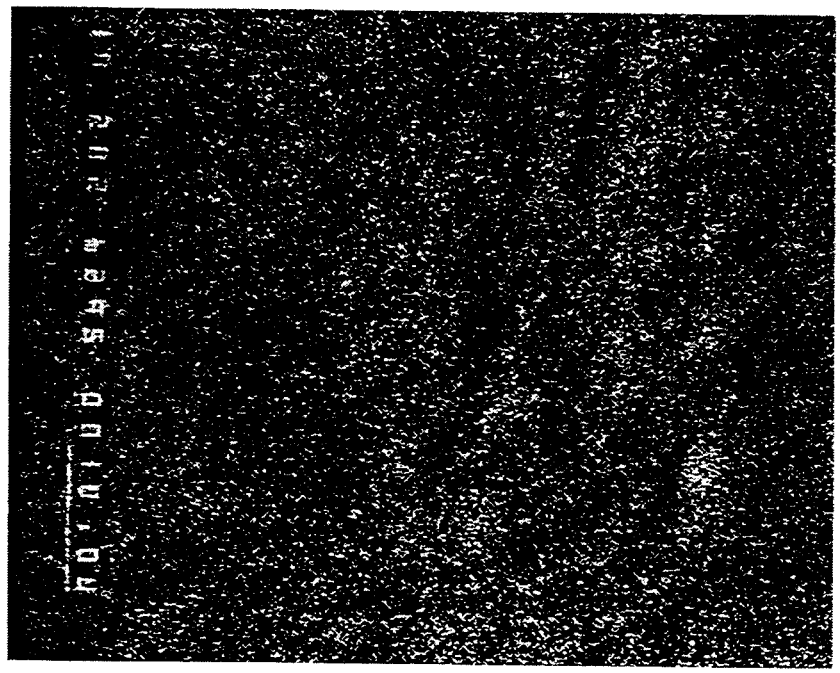
FIG. 12 is an Energy Dispersion Spectroscopy analysis at 2,000 X for the oxygen content of the sample of FIGS. 7-9.

Scanning electron micrographs are shown at FIGS. 7 and 8 for PVC containing 20 to 30 wt-% of the mixture set forth in Table 11. The domains created by the polymeric and unreacted monomer mixture in the PVC can be distinguished easily. Surprisingly, the toxicant monomer molecules are preferentially concentrated with the acrylic ingredients which created the domains in the PVC binder. An oxygen density map (oxygen is analyzed rather than chlorine because of the chlorine content of the binder) of the film surface (see FIGS. 9–12) clearly indicates that the only place oxygen resides is in the domains. Interestingly, the oxygen is not distributed in the domain void or sea-like regions of the PVC. The oxygen maps clearly outline only those regions/domains or islands where the toxicant molecules reside, and not in the sea or continuous phase of the PVC. The light or bright areas in these figures are due to the presence of oxygen and the dark regions are due to the absence of oxygen.

Example 18

Sample 2 of Example 16 was prepared again, except that the hexachlorophene toxicant was replaced by Nopocide N-96. Thus, a blend of domain-forming LP-32 polysulfide resin and the Nopocide is being evaluated with respect to the formation of PCDs of Nopocide. The cured epoxy resin system was subjected to SEM and EDS analysis with the results set forth at FIGS. 13–15.

Figure 13:
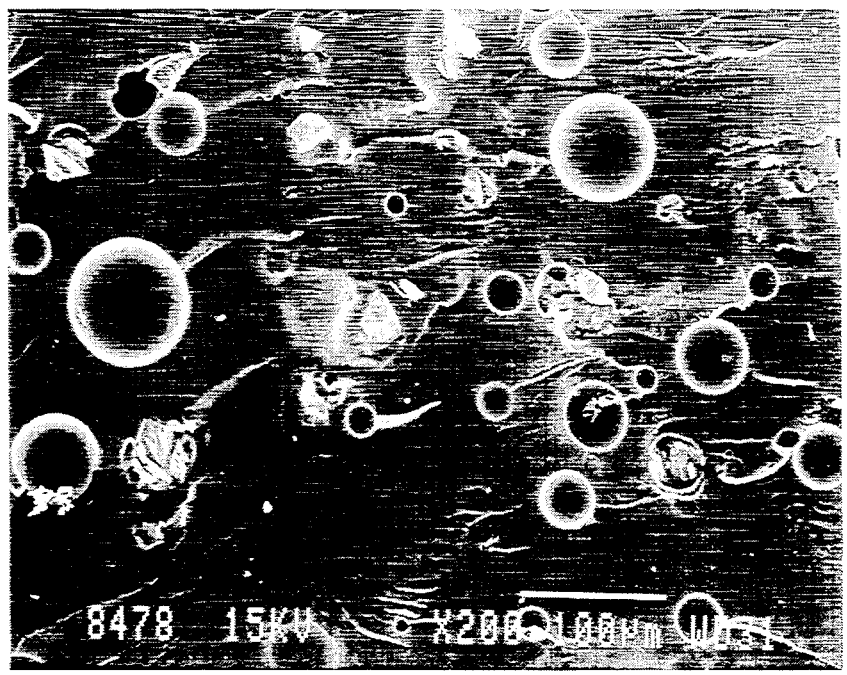
FIG. 13 is an optical micrograph at 200 X showing the domain structures formed in a continuous epoxy resin by LP-32 polysulfide resin of Example 18.
Figure 14:
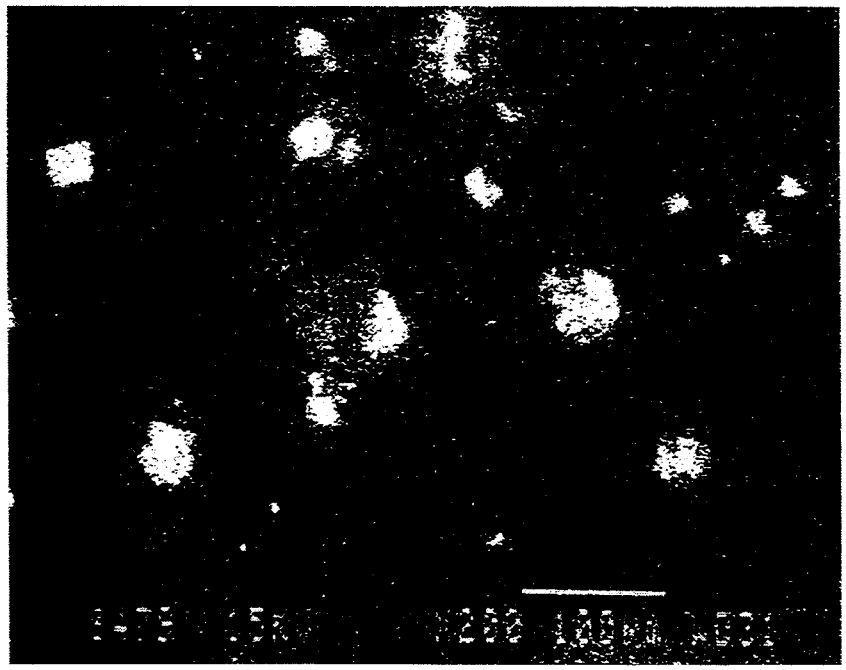
FIGS. 14-15 are Energy Dispersion Spectroscopy maps at 200 X for chlorine and sulfur, respectively, of the resin system of FIG. 13.
Figure 15:
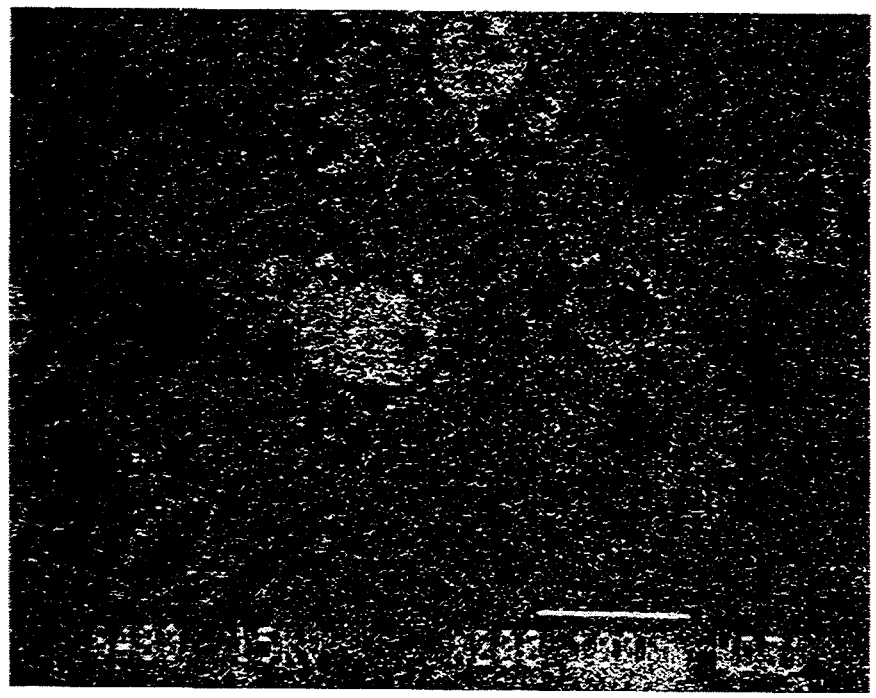

FIG. 13 is the SEM micrograph of an area of the cured epoxy resin at 200 X. It is evident that the LP-32 polysulfide polymer created discrete domains. FIG. 14 displays the EDS analysis of chlorine at 200 X, while FIG. 15 is for sulfur. A comparison of the two EDS maps reveals that chlorine and sulfur both are present at the same location in the cured epoxy resin system. Chlorine comes from the Nopocide toxicant, while sulfur comes from the LP-32 polysulfide resin. Again, then, the formation of PCDs of non-tin, organo anti-fouling agents is seen to have been achieved. Here, such formation is due to the preferential formation of domains by the LP-32 polysulfide polymer with the concomitant preferential concentration of the toxicant with the polysulfide polymer.

We claim:

1. In a non-tin-containing, curable, marine anti-fouling composition consisting of a film of a cured thermoplastic or thermoset binder, and an amount of a non-tin and anti-fouling agent effective for imparting anti-fouling properties to the film of the cured composition when said film is used in a marine environment, the improvement wherein said anti-fouling agent is dispersed in a compound to form a mixture which mixture forms a separate phase of discrete domains of about 0.3 to 500 microns in the film of the cured binder which domains have concentrations of said anti-fouling agent higher than the concentration of said anti-fouling agent in the continuous phase, and wherein said anti-fouling agent consists of a water-insoluble, organo or inorganic compound selected from the group consisting of heterocyclic compounds, aromatic compounds substituted with heteroatom substitutents, amino compounds, carbocyclic vinyl ether ketones, phospho compounds, polychlorinated carbocyclic and acyclic compounds, chlorinated carbocyclic carboxylates, copper (cupric) oleate, alkyl dimethyl benzene, 2,4-d,α-chlorocrotyl ester, 2,3-dichloro-2-methylpropionic acid sodium salt, diphenylacetrontrile, n-dodecyl thiocyanate, ethyl-N,N-dipropylthiolcarbamate, ethyl-N,N-diisobutyl thiolcarbamate, ethylenebis (dithiocarbamato) zinc, ferric dimethyl-dithiocarbamate, isobornyl thiocyanoacetate, manganese ethylenebisdithiocarbamate, disodium ethylene bisdithiocarbamate, s-propylbutylethylthiocarbamate, piperonyl-bis(2-[2'-n-butoxyethoxy]ethyl)acetal, piperonyl butoxide alpha[2-(2-n-butoxyethoxy)-ethoxy]4,5-methylenedioxy 2-propyltoluene, piperonyl cyclonen, 3',4'-dichloropropionalide, ethylene-1,2-bis (thiocarbamoyldimethylthiocarbamoyldisulfide), 5,6,7,8-tetrahydro-1-naphthyl methylcarbamate, 2-thiocyanoethyl dodecanoate, tetramethylthiuram disulfide, tert-butyl 4(or 5)-chloro-2-methylcyclohexanecarboxylate, S-propyldipropylthiocarbamate, zinc ethylene bisdithiocarbamate, zinc dimethyldithiocarbamate, antimony tartrate, antimony potassium tartrate, boric acid, ammonium sulfamate, and mixtures thereof, and having a X value of between about 0.01 and 0.5, a Z parameter for vinyl or aromatic compounds of between about 0.01 and 0.08, and an LD50 value of greater than 200 mg/kg body weight against rats or mice, where X is the weight fraction of heteroatoms contained in the monomer or monomer repeat unit of said anti-fouling agent, Z is the weight fraction of $\pi$ electrons contained in the monomer or monomer repeat unit of said anti-fouling agent, and LD50 is the lethal oral dose of said anti-fouling agent which is expected to kill 50% of the population of a test group of adult male rats or mice.

2. The composition of claim 1 wherein the X value is established by said agent containing heteroatoms selected from the group consisting of sulfur, oxygen, nitrogen, halogen, and mixtures thereof.

3. The composition of claim 1 wherein said aromatic compound with heteroatomic substituents is selected from the group consisting of monoaromatic compounds; fused aromatic rings; and di-aromatic compounds linked with a sigma bond, a dialkylene group, or a divalent heteroatomic group; and mixtures thereof.

4. The composition of claim 1 wherein said anti-fouling agent is selected from the group consisting of:
4-allyl-2-methoxyphenol
2,3-dichloro-1,4-napthoquinone
cetylpyridinium chloride
diphenylamine
2-chloro-N,N-diallylacetamide
cetyltrimethylammonium bromide
2-isopropylamino-4-chloro-6-ethylamino triazine
dimethoxythiophosphate derivative of diphenyl sulfide
ethyl 4-chloro-alpha(4-chlorophenyl) alpha-hydroxy benzene acetate methyl,
diethylamino, dimethoxythiophosphate derivative of pyrimidine
ethoxylated nonylphenol
unsymmetrical hydrazine derivative of succinic acid
allyl, methylhydroxy substituted cyclopententone ester of dimethylpropenyl cyclopropane carboxylic acid 2,5-dichloro,3-amino benzoic acid
cinnamic acid
2,-6-dichloro, 4-nitroaniline
dichloro, isopropenyl anilide
dodecylguanidine monoacetate trichlorophenyl acetic acid
diphenyl ether, chlorophenyl derivative of the isobutyric acid ester of hydroxylacetonitrile
trihydroxybenzoic acid
3-indolacetic acid
3,5-dichloro-N-(3,3-dimethylpropyne)benzamide
napthalene acetamide dimethylethylphenoxy-cyclohexyl-2-propynyl sulfite
o-phenylphenol
phthalic acid
chlorophenyl-isopropyl, propynyl carbamate
N-phenyl,N-butynyl chloroacetamide
amino, chloro, phenyl derivative of azacyclohexamine
N,N-diallyl-2-chloroacetamide
aminoacetic acid derivative of methylphosphonate
3,5-dinitro,4-N,N-dipropylamino benzene sulfonamide
2-chloro-2-propenyl diethylcarbamodithioate
and mixtures thereof.

5. The composition of claim 1 wherein said anti-fouling agent is selected from the group consisting of:
acrolein phenylhydrazone
ammonium saccharinate
2-allyl-4-hydroxy-3-methyl-2-cyclopenten-1-one ester of 2,2-dimethyl-3-(2-methylpropenyl cyclopropanecarboxylic acid)
4-allyl-2-methoxyphenol o-(allyloxy) phenyl methylcarbamate
2-(allylthio)-2-thiazoline
1,2,3,4,7,7-hexachloro-5,6-bis(chloromethyl)-2-norbornene
4-ethylamino-6-isopropylamino-2-methylthio-1,3,5-triazine
2-amino-3-chloro-1,4-napthoquinone
3-amino-5-nitro-o-toluamide
3-amino-1,2,4-triazole
2-chloro-4-ethylamino-6-isopropylamino-S-triazine
4-chloro-m-chlorocarbanilate
6-chloropiperonyl chrysanthemumate
N-butyl-N-ethyl-α,α,α-trifluoro-2-6-dinitro-p-toluidine
bis (p-chlorophenyl)-3-pyridine methanol
bis (dialkylphosphinothioyl) disulfide
bis (4-hydroxyiminomethyl pyridinum-1-methyl) ether dichloride
2,4-bis (3-methoxylpropylamino)-6-methylthio-S-triazine
bis (pentachloro-2,4-cyclopentadien-1-yl)
N-(4-bromo-3-chlorophenyl)-N'-methoxy-N'-methyl urea
5-(bromomethyl)-1,2,3,4,7,7-hexachloro-2-norbornene
S-(O,O-diisopropyl phosphoro-dithionate of N-(2-mercaptoethyl) benzenesulfonamide
benzamidooxy-acetic acid
3-benzylideneamino-4-phenylthiazoline-2-thione
bis (p-chlorophenoxy) methane bis (4-chlorophenyl) disulfide
1,1-bis (pochlorophenyl) ethane 1,1-bis (p-chlorphenyl)-ethanol
o,o-dimethyl-o-2,5-dichloro-4-bromophenylthionophosphate
O,O-dimethyl-2,2,2-trichloro-1-n-butyryloxyethyl phosphonate
N-butylacetanilide
2-tert-butylamino-4-chloro-6-ethyl amino-5-triazine
2-tert-butylamino-4-ethylamino-6methylmercapto-S-triazine
4-tert-butyl-2-chlorophenylmethyl methylphosphoramidite
o-(4-tert-butyl-2-chlorophenyl)o-methyl phosphoramidothionate
butyl 3,4-dihydro-2,2-dimethyl-4-oxo-1,2h-pyran-6-carboxylate
n-butyl-9-hydroxyfluorene-(9)-carboxylate
2-(p-tert-butylphenoxy) cyclohexyl 2-propynyl sulfite
1-butyn-3-yl m-chlorophenyl-carbamate
N-trichloro-methylthio-4-cyclohexene-1,2-docarboximide
1-napthyl n-methylcarbamate
S-[[(p-chlorophenyl) thiol]methyl]O,O-diethylphosphorodithioate
2-chloro-N,N-diallyl-acetamide
2-chloroallyl diethyl-dithiocarbarnate
cetyldimethylethylammonium bromide
cetylpyridinium chloride
tetrachloro-p-benzoquinone
2-chloro-4,6-bis(diethylamino)-s-triazine
p-chlorobenzyl p-chlorophenyl sulfide
1,2,3,5,6,-7,8,8-octachloro-2,3,3a,4,7,7a-hexahydro-4,7-methanoindene
1-(3-chlorallyl)-3,5,7-triaza-1-azoniaadamantane chloride
ethyl 4,4'-dichlorobenzylate
5-chloro-2-benzothiazolethiol zinc salt
p-chlorobenzyl p-fluorophenyl sulfide
1-chloro-N'-(3,4-dichlorophenyl) N,N-dimethylformamidine
4-chloro-3,5-dimethyl phenoxy-ethanol
1,4-dichloro-2,5-dimethoxybenzene
1-(chloro-2-norbomyl)-3,3-dimethylurea
S-(p-chloro-α-phenylbenzyl) O,O-diethyl phosphorodithioate
p-chlorophenyl ester of benzene-sulfonic acid
N-3-chlorophenyl-1-(isopropyl-carbamoyl-1)-ethyl carbamate
3-(p-chlorophenyl)-5-methyl rhodanine
4 (and 6)-chloro-2-phenylphenol sodium salt
p-chlorophenyl phenyl sulfone
4-chlorophenyl 2,4,5-trichloro-phenylazosulfide
N-(5-chloro-5-thiazolyl) propionamide
2-[4-chloro-o-tolyl)oxy]propionanilide
2-chloro-1-(2,4,5-trichloro-phenyl) vinyl dimethyl phosphate
N'-(4-chlorophenoxy) phenyl N,N-dimethylurea
isopropyl N-(3-chlorophenyl) carbamate
copper 8-quinolinolate
2-(2,4-dihydroxyphenyl)-1-cyclohexene-1-carboxylic acid-lactone O,O-diethylphosphorothioate
2-chloro-4-dimethylamino-6-methylpyrimidine
3-(2-cyclopenten-1-yl)-2-methyl-4-oxo-2-cyclopenten-1-yl chrysanthemunate
α-cyclohexyl-α-phenyl-3-pyridyl-methanol, hydrochloride
N'-cyclo-octyl-N,N-dimethylurea
3',4'-dichlorocyclopropanecarboxanilide
2,4-dichlorophenoxyacetic acid
3,5-dimethyl-1,3,5,2H-tetrahydrothiadiazine-2-thione, tetra-hydro-3,5-dimethyl-2H-1,3,5-thiadiazine-2-thione
4-(2,4-dichlorophenoxy) butyric acid
dimethyl 2,3,5,6-tetra-chloroterephthalate decyltriphenylphosphonium-bromochlorotriphenyl-stannate
dehydroacetic acid (and its sodium salt)
tris and bis(2,4-dichlorophenoxyethyl) phosphite
2-methyl-thio-4-isopropylamino-6-methylamino-s-triazine
S-2,3-dichloroallyl N,N-diisopropyl thiolcarbamate
1,3-diaza-2,4-cyclopentadiene
N,N-di-n-butyl-p-chlorobenzene-sulfonamide 3,6-dichloro-o-anisic acid
O-(2-chloro-4-nitrophenyl) O,O-dimethyl phosphorothioate
2,6-dichlorobenzonitrile
2,3-dichloro-1, 4-naphthoquinone
1,3-bis(1-hydroxy-2,2,2-trichloroethyl) urea
3,4-dichlorobenzyl methylcarbamate (80%) mixture with 2,3-dichlorobenzyl methylcarbamate (20%)
1,1-dichloro-2,2-bis (p-ethylphenyl)ethane
2,4-dichloro-6-(o-chloro-anilino)-s-triazine
N-(dichlorofluoromethylthio)-N'N'-dimethyl-n-phenyl sulfamide
4,4'-dichloro-N-methylbenzene-sulfoanilide
2,6-dichloro-4-nitroaniline
2,5-dichloro-3-nitrobenzoic acid
5,2'-dichloro-4'-nitro-salicylanilide ethanolamine salt
2',5'-dichloro-4'-nitrososalicylanilide
2,2'-dihydroxy-5,5'-dichlorophenylmethane
1-(2,4-dichlorophenoxyacetyl)-3,5-dimethyl pyrazole
N-3,4-dichlorophenyl N'-5-chloro-2-(2-sodium sulfonyl-4-chlorophenoxy) phenyl urea
2,4-dichlorophenyl ester of benzene sulfonic acid
2,4-dichlorophenyl methanesulfonate
2,4-dichlorophenyl 4-nitrophenyl ether 4-dichlorotetrahydrothiophene 1,1-dioxide
4,4'-dichloro-alpha-trichloromethylbenzhydrol
3',4'-dichloro-2-methacrylanilide (Diethoxyphosphinothioylthio) gamma-butyrolactone
O,O-diethyl s-carboethoxymethyl phosphorothioate
O,O-diethyl O-naphthylamido phosphorothioate
O,O-diethyl O-3,5,6-trichloro-2-pyridyl phosphorothioate
2,2'-dihydroxy-3,5,3',5',4''-pentachlorotriphenylmethane 2''-sodium sulfonate
O,O-diisopropyl s-diethyldithiocarbamoyl phosphorodithioate
2,4-dimethylbenzyl 2,2-dimethyl-3-(2-methylpropenyl)cyclopropanecarboxylate
O,O-dimethyl-S-2-(acetylamino)-ethyl dithiophosphate
N-dimethylamino succinamic acid
1,1-dimethyl-3-[3-(n-tert-butyl-carbamoyloxy)-phenyl]urea
O,O-dimethyl s-carboethoxymethyl phosphorothioate
O,O-dimethyl O-(3-chloro-4-nitrophenyl) phosphorothioate
O,O-dimethyl-o-p-cyanophenyl phosphorothioate
o,o-dimethyl-s-[5-ethoxy-1,3,4-thiadiazol-2(3H)-onyl-(3)-methyl]phosphorodithioate
N,N-dimethyl-N'-(2-methyl-4-chlorophenyl)-formamidine hydrochloride
O,O-dimethyl o-(4-nitro-m-tolyl) phosphorothioate
o,s-dimethyl tetrachloro thiotere-phthalate
4'-dimethyltriazenoacetanilide
dinitrocyclohexylphenol
2,4'-dinitro-4-trifluoromethyl diphenylether
2-(1-methyl-n-heptyl)-4,6-dinitrophenyl crotonate
N,N-dimethyl-2,2-diphenylacetamide
diphenylamine
2,6-dinitro-N,N-di-n-propyl-p-toluidine
di-n-propyl-2,5-pyridine-dicarboxylate
1,1'-ethylene-2,2'-dipyridinium dibromide
2,3-dicyano-1,4-dithia-anthraquinone
3-(3,4-dichlorphenyl)-1, 1-dimethyl-urea
n-dodecylguanidine acetate
2-(2,4,5-trichlorophenoxy)ethyl-2,2-dichloropropionate
ethoxymethylbis (p-chlorophenyl) carbinol
1,2-dihydro-6-ethoxy-2,2,4-trimethylquinone
3-phenyl-1,1-dimethylurea trichloroacetate
O,O-dimethyl S-(N-formyl-N-methylcarbamoylmethyl)phosphorodithioate
2-formyl-4-chlorophenoxyacetic acid
3-furfuryl-2-methyl-4-oxo-2-cyclopenten-1-yl chrysanthemunate
2-heptadecyl-2-imidazoline
7-chloro-4,6-dimethoxycoumaran-3-one-2-spiro-1'-(2'-methoxy-6'-methylcyclohex-2'-en-4'-one)
1,1,1,3,3,3,-hexachloro-2-propanone
1,5a,6,9,9a,9b-hexahydro-4a(4H)-dibenzofuran-carboxaldehyde
9-(p-n-hexyloxyphenyl)-10-methyl-acridinium chloride
2-hydroxymethyl-4-chloro-phenoxyacetic acid
N-hydroxy-methyl-2,6-dichlorothiobenzamide
Isopropyl N-phenylcarbamate
isobutyl triphenylmethylamine
5-bromo-3-isopropyl-6-methyluracil
isopropyl-4,4'-diboromobenzilate
isopropyl 4,4'-dichlorobenzilate
isorpropyl mercaptophenyl-acetate, O,O-dimethyl phosphorodithioate
3-cyclohexyl-6,7-dihydro-1H-cyclopentapyrimidine-2,4(3H,5H)-dione
3-(3,4-dichlorophenyl)-1-methoxy-1-methylurea
S-[1,2-bis(ethoxy-carbonyl)ethyl]O,O-dimethyl phosphorodithioate
4-chloro-2-methylphenoxyacetic acid
2-(4-chloro-2-methylphenoxy) propionic acid
sec-butyl 4(or 5)-chloro-2-methylcyclohexanecarboxylate
s-[(4,6-diamino-s-triazine-2-yl)methyl]O,O-dimethyl phosphorodithioate
2-isopropylamino-4-(3-methoxypropylamino)-6-methylthio-s-triazine
1,1,1-trichloro-2,2-bis(p-methoxyphenyl) ethane
2-methoxy-4-isopropylamino-6-diethylamino-s-triazine
S-(N-methoxymethylcarbamoylmethyl) dimethyl phosphorothiolothiononate
alpha-methylbenzyl 3-(dimethoxy-phosphinyloxy)-cis-crotonate
m-(1-methyl butyl) phenyl methyl-carbamate
methyl-2-chloro-9-hydroxyfluorene-(9)-carboxylate
3,3'-methylenebis (4-hydroxycoumarin)
2,2'-methylenebis (3,4,6-trichlorophenol)
6-methyl-2-oxo-1,3-dithio(4,5-b)quinoxaline
O,O-dimethyl S-(2,5-dichlorophenyl-thio)-methyl phosphorodithioate
3(2-methylpiperidino)propyl-3,4-dichlorobenzoate
4-(methylsulfonyl)-2,6-dinitro-n,n-dipropylaniline
methyl-2,3,5,6-tetrachloro-n-methoxy-n-methyl-terephthalamate
O-methyl O-(2,4,5-trichloro-phenyl) amidophosphorothiomate
3-(p-bromophenyl)-1-methyl-1-methoxyurea 1,2-dihydropyridazine-3,6-dione
3,3'-ethylenebis-(tetrahydro-4,6-dimethyl-2H-1,3,5-thiadiazone-2-thione)
S-ethyl hexahydro-1H-azepine-1-carbothioate
3-(p-chlorphenyl)-1,1-dimethylurea
3-(p-chlorophenyl)-1,1-dimethylurea trichloroacetate
1,2-dibromo-2,2-dichloroethyl dimethyl phosphate
beta-naphthoxyacetic acid
3-(3,4-dichlorophenyl)-1-methyl-1-n-butylurea
3-(hexahydro-4,7-methanoindan-5-yl)-1,1-dimethylurea
N-1-naphthyl-phthalamic acid
p-chlorophenyl p-phenyl 4-chlorobenzenesulfonate
phenothiazine
ethyl mercapto-phenylacetate O,O-dimethyl-phosphorodithioate
n-phenyl-1-(ethylcarbamoyl-1) ethylcarbamate (d isomer)
phosphoric acid, 2-chloro-1-(2,4,5-trichlorophenyl)-vinyl dimethyl ester
4-amino-3,5,6-trichloropicolinic acid
polychlorobenzoic acid, dimethylamine salt
2,4-bis-(isopropylamino)-6-methoxy-s-triazine
2-methyl-mercapto-4,6-bis (isopropylamino)-s-triazine
2-chloro-n-isopropylacetanilide
2-chloro-4,6-bis(isopropyl-amino)-s-triazine
di-n-propyl-3-methyl-6,7-methylenedioxy-1,2,3,4-tetra-hydronaphthalene-1,2dicarboxylate
5-amino-4-chloro-2-phenyl-3(2H) pyridazinone
pyrethrin I
8-quinolinol
dimethyl 2,4,5-trichlorophenyl phosphorothionate
salicylanilide
1-(3,4-methylene-dioxyphenoxy)-3,6,9-trioxoundecane
sodium 2-(2,4-dichlorophenoxy)ethyl sulfate
1-(2-methyl-cyclohexyl)-3-phenylurea
1-(2,4,5-trichlorophenoxy) propionic acid
N'-chlor-2-methyl-p-valerotoluidide
1,2-methylenedioxy-4-[2-(octylsulfinyl)propyl]benzene
methyl 3,4-dichlorocarbanilate
2,4,5-trichlorophenoxyacetic acid
trichlorobenzyl chloride
2,2-bis(p-chlorophenyl)-1,1-dichloroethane
3-tert-butyl-5-chloro-6-methyluracil
2,6-di-tert-butyl-p-tolylmethylcarbamate 2,3,6,7-tetrachloro-4a,8a-epoxy-1,2,3,4,4a,8a-hexahydro-1,4-methanonaphthalene-5,8-dione
N-(1,1,2,2-tetrachloro-ethyl-sulfenyl)-cis-4-cyclohexene-1,2-dicarboximide
2,4,5,6-tetrachloroiso-phthalonitrile
1,2,4,5-tetrachloro-3-nitrobenzene
p-chlorophenyl 2,4,5-trichlorophenyl sulfone
3,4,5,6-tetrahydrophthalimidomethyl 2,2-dimethyl-3-(2-methylpropenyl) cyclopropanecarboxylate
O,O,O',O'-tetramethyl O,O'-thiodi-p-phenylene phosphorothioate
1,3,6,8-tetranitrocarbazole
2-(4-thiazolyl) benzimidazole
2,2'-thiobis(4,6-dichlorophenol)
2,3-quinoxaline-dithiol cyclic trithiocarbonate
N-meta-tolyl phthalamic acid
S-2,3,3-trichloroallyl N,N-di-isopropyl-thiolcarbamate
O,O-dimethyl (1-hydroxy-2,2,2-trichloroethyl)phosphonate
2,3,6-trichlorobenzoic acid
trichlorobenoic acid, dimethylamine salt
4,5,7-trichlorobenzthiadiazole-2,1,3
2,3,6-trichlorobenzyloxypropanol
N-trichloromethylthio-benzothiazolone
N-trichloromethylthiobenzoxazolone
2,2,2-trichloro-n-(pentachloro-phenyl)acetimidoyl chloride
2-(2,4,5-trichlorophenoxy)ethyl sulfate, sodium salt
N,N'-N"-trichloro-2,4,6-triamine-1,3,5-triazine
2-chloro-4-(di-ethylamino)-6-(ethylamino)-s-triazine
3,5-dinitro-o-toluamide
and mixtures thereof.

6. In a non-tin-containing, curable, marine anti-fouling composition consisting of a film of a cured thermoplastic or thermoset binder, and an amount of a non-tin and anti-fouling agent effective for imparting anti-fouling properties to the film of the cured composition when said film is used in a marine environment, the improvement wherein said anti-fouling agent is provided to contain reactive functionality which reactive functionality is used for reacting said anti-fouling agent with a monomer, oligomer, or polymer, to form a product which product forms a separate phase of discrete domains of about 0.3 to 500 microns in the film of the cured binder which domains have concentrations of said anti-fouling agent higher than the concentration of said anti-fouling agent in the continuous phase, and wherein said anti-fouling agent consists of a water-insoluble, organo or inorganic compound selected from the group consisting of heterocyclic compounds, aromatic compounds substituted with heteroatom substituents, amino compounds, carbocyclic vinyl ether ketones, phospho compounds, polychlorinated carbocyclic and acyclic compounds, chlorinated carbocyclic carboxylates, copper (cupric) oleate, alkyl dimethyl benzene, 2,4-d,α-chlorocrotyl ester, 2,3-dichloro-2-methylpropionic acid sodium salt, diphenylacetronitrile, n-dodecyl thiocyanate, ethyl-N,N-dipropylthiolcarbamate, ethyl-N,N-diisobutyl thiolcarbamate, ethylenebis (dithiocarbamato) zinc, ferric dimethyl-dithiocarbamate, isobornyl thiocyanoacetate, manganese ethylenebisdithiocarbamate, disodium ethylene bisdithiocarbamate, s-propylbutyl-ethylthiocarbamate, piperonyl-bis(2-[2'-n-butoxyethoxy]ethyl) acetal, piperonyl butoxide alpha[2-(2-n-butoxyethoxy)-ethoxy]4,5-methylenedioxy 2-propyltoluene, piperonyl cyclonene, 3',4'-dichloropropionalide, ethylene-1,2-bis (thiocarbamoyldimethylthio-carbamoyldisulfide), 5,6,7,8-tetrahydro-1-naphthyl methylcarbamate, 2-thiocyanoethyl dodecanoate, tetramethylthiuram disulfide, tert-butyl 4(or 5)-chloro-2-methylcyclohexanecarboxylate, S-propyldipropylthiocarbamate, zinc ethylene bisdithiocarbamate, zinc dimethyldithiocarbamate, antimony tartrate, antimony potassium tartrate, boric acid, ammonium sulfamate, and mixtures thereof, and having a X value of between about 0.01 and 0.5, a Z parameter for vinyl or aromatic compounds of between about 0.01 and 0.08, and an LD50 value of greater than 200 mg/kg body weight against rats or mice, where X is the weight fraction of heteroatoms contained in the monomer or monomer repeat unit of said anti-fouling agent, Z is the weight fraction of $\pi$ electrons contained in the monomer or monomer repeat unit of said anti-fouling agent, and LD50 is the lethal oral dose of said anti-fouling agent which is expected to kill 50% of the population of a test group of adult male rats or mice.

7. The composition of claim 6 wherein said monomer, oligomer, or polymer contains heteroatomic substituents and said substituents are selected from the group consisting of nitrogen, sulfur, or both.

8. The composition of claim 1 which consists of a film-forming coating composition.

9. In a non-tin-containing, curable, marine anti-fouling composition consisting of a film of a cured thermoplastic or thermoset binder, and an amount of a non-tin and anti-fouling agent effective for imparting anti-fouling properties to the film of the cured composition when said film is used in a marine environment, the improvement which comprises complexing said anti-fouling agent with a metal ion to form a coordination compound which compound forms a separate phase of discrete domains of about 0.3 to 500 microns in the film of the cured binder which domains have concentrations of said anti-fouling agent higher than the concentration of said anti-fouling agent in the continuous phase, and wherein said anti-fouling agent consists of a water-insoluble, organo or inorganic compound selected from the group consisting of heterocyclic compounds, aromatic compounds substituted with heteroatom substituents, amino compounds, carbocyclic vinyl ether ketones, phospho compounds, polychlorinated carbocyclic and acyclic compounds, chlorinated carbocyclic carboxylates, copper (cupric) oleate, alkyl dimethyl benzene, 2,3-d,α-chlorocrotyl ester, 2,3-dichloro-2-methylpropionic acid sodium salt, diphenylacetronitrile, n-dodecyl thiocyanate, ethyl-N,N-dipropylthiolcarbamate, ethyl-N,N-diisobutyl thiolcarbamate, ethylenebis (dithiocarbamato) zinc, ferric dimethyl-dithiocarbamate, isobornyl thiocyanoacetate, manganese ethylenebisdithiocarbamate, disodium ethylene bisdithiocarbamate, s-propylbutyl-ethylthiocarbamate, piperonyl-bis(2-[2'-n-butoxyethoxyethyl) acetal, piperonyl butoxide alpha[2-(2-n-butoxyethoxy)-ethoxy]4,5-methylenedioxy 2-propyltoluene, piperonyl cyclonene, 3',4'-dichloropropionalide, ethylene-1,2-bis (thiocarbamoyldimethylthiocarbamoyldisulfide), 5,6,7,8-tetrahydro-1-naphthyl methylcarbamate, 2-thiocyanoethyl dodecanoate, tetramethylthiuram disulfide, tert-butyl 4(or 5)-chloro-2-methylcyclohexanecarboxylate, S-propyldipropylthiocarbamate, zinc ethylene bisdithiocarbamate, zinc dimethyldithiocarbamate, antimony tartrate, antimony potassium tartrate, boric acid, ammonium sulfamate, and mixtures thereof, and having a X value of between about 0.01 and 0.5, a Z parameter for vinyl or aromatic compounds of between about 0.01 and 0.08, and an LD50 value of greater than 200 mg/kg body weight against rats or mice, where X is the weight fraction of heteroatoms contained in the monomer or monomer repeat unit of said anti-fouling agent, Z is the weight fraction of $\pi$ electrons contained in the monomer or monomer repeat unit of said anti-fouling agent, and LD50 is the lethal oral dose of said anti-fouling agent which is expected to kill 50% of the population of a test group of adult male rats or mice.

10. The composition of claim 6 wherein the X value is established by said agent containing heteroatoms selected from the group consisting of sulfur, oxygen, nitrogen, halogen, and mixtures thereof.

11. The composition of claim 6 wherein said aromatic compound with heteroatomic substituents is selected from the group consisting of monoaromatic compounds; fused aromatic rings; and di-aromatic compounds linked with a sigma bond, a dialkylene group, or a divalent heteroatomic group; and mixtures thereof.

12. The composition of claim 9 wherein the X value is established by said agent containing heteroatoms selected from the group consisting of sulfur, oxygen, nitrogen, halogen, and mixtures thereof.

13. The composition of claim 9 wherein said aromatic compound with heteroatomic substituents is selected from the group consisting of monoaromatic compounds; fused aromatic rings; and di-aromatic compounds linked with a sigma bond, a dialkylene group, or a divalent heteroatomic group; and mixtures thereof.

* * * * *

UNITED STATES PATENT AND TRADEMARK OFFICE
CERTIFICATE OF CORRECTION

PATENT NO. : 5,441,743

DATED : August 15, 1995

INVENTOR(S) : Vincent D. McGinniss and Richard J. Dick

It is certified that error appears in the above—identified patent and that said Letters Patent is hereby corrected as shown below:

[57] ABSTRACT, lines 10-12, "The art term used in describing the PCDs of anti-fouling agent is not limitative of the invention as the disclosure herein will demonstrate." should be deleted.

[57] ABSTRACT, line 19, "a X factor" should be -- a $\chi$ factor --.

Column 2, line 33, "a X value" should be -- a $\chi$ value --.

Column 4, line 37, "a X factor" should be -- a $\chi$ factor --.

Column 4, line 39, "The X factor" should be -- The $\chi$ factor --.

Column 4, line 43, "the X" should be -- the $\chi$ --.

Column 4, line 51, "a X" should be -- a $\chi$ --.

Column 4, line 66, "X factor" should be -- $\chi$ factor --.

Column 11, line 21, "organo-fin" should be -- organo-tin --.

Column 11, line 34, "requisite X value" should be -- requisite $\chi$ value --.

Column 12, line 63, "(chloroo2-norbomyl)" should be -- (chloro-2-norbornyl) --.

Column 14, line 60, "isobomyl" should be -- isobornyl --.

Column 15, line 6, "2,6-(" should be -- 2-( --.

Column 15, line 23, "-methyl-2" should be -- 6-methyl-2 --.

UNITED STATES PATENT AND TRADEMARK OFFICE
CERTIFICATE OF CORRECTION

PATENT NO. : 5,441,743
DATED : August 15, 1995
INVENTOR(S) : Vincent D. McGinniss and Richard J. Dick It is certified that error appears in the above-identified patent and that said Letters Patent is hereby corrected as shown below:

Column 15, line 26, "(2-" should be -- 3(2- --.

Column 15, line 27, "6-(" should be -- 4-( --.

Column 21, the table between lines 40 and 50 should be entitled -- TABLE 2 --.

Column 22, after TABLE 4 and before Example 13 insert the sentence -- Again, the efficacy of the PCD anti-fouling agents is established. --

Column 25, line 55, "and anti-fouling agent" should be -- anti-fouling agent --.

Column 26, line 6, "diphenylacetrontrile," should be -- diphenylacetonitrile --.

Column 26, line 23, "having a X" should be -- having a $\chi$ --.

Column 26, line 27, "where X is" should be -- where $\chi$ is --.

Column 26, line 64, "ylic acid 2,5-dichloro,3-amino benzoic acid" should read on line 64 -- xylic acid -- line 65 should then read -- 2,5-dichloro,3-amino benzoic acid --.

Column 27, line 6, "3,5-dichloro-N-(3,3-dimethylpropyne)benzamide" should be deleted.

Column 27, line 61, "1,1-bis (pochlorophenyl) ethane" should be -- 1,1-bis (p-chlorophenyl) ethane --.

Column 28, line 19, "dithiocarbarnate" should be -- dithiocarbamate --.

Column 28, line 37, "norbomyl" should be -- norbornyl --.

UNITED STATES PATENT AND TRADEMARK OFFICE
CERTIFICATE OF CORRECTION

PATENT NO. : 5,441,743
DATED : August 15, 1995
INVENTOR(S) : Vincent D. McGinniss and Richard J. Dick It is certified that error appears in the above—identified patent and that said Letters Patent is hereby corrected as shown below:

Column 29, line 9, "3,6-" should be on line 10 which should then read -- 3,6-dichloro-o-anisic acid --.

Column 32, line 57, "having a X" should be -- having a $\chi$ --.

Column 32, line 61, "where X is" should be -- where $\chi$ is --.

Column 33, line 10, "and anti-fouling" should be -- anti-fouling --.

Column 33, line 28, "2,3-d,$\alpha$-chlorocrotyl" should be -- 2,4-d,$\alpha$-chlorocrotyl --.

Column 33, line 29, "diphenylacetroni-" should be -- diphenylacetoni- --.

Column 34, line 7, "having a X" should be -- having a $\chi$ --.

Column 34, line 11, "where X is" should be -- where $\chi$ is --.

Column 34, line 19, "the X value" should be -- the $\chi$ value --.

Column 34, line 29, "the X value" should be -- the $\chi$ value --.

UNITED STATES PATENT AND TRADEMARK OFFICE
CERTIFICATE OF CORRECTION

PATENT NO. : 5,441,743
DATED : August 15, 1995
INVENTOR(S) : Vincent D. McGinniss and Richard J. Dick It is certified that error appears in the above—identified patent and that said Letters Patent is hereby corrected as shown below:

Column 17, line 22, "Regardless or the" should be -- Regardless of the --.

Column 21, line 55, "form a PCDs" should be -- form of PCDs --.

Column 24, line 37, "Engergy" should be -- Energy --.

Signed and Sealed this

Twenty-fifth Day of June, 1996

BRUCE LEHMAN

Attest:

Attesting Officer

Commissioner of Patents and Trademarks